US011441366B2

(12) United States Patent
Magnuson

(10) Patent No.: US 11,441,366 B2
(45) Date of Patent: Sep. 13, 2022

(54) SPINNER WITH CONSUMABLE SLEEVE

(71) Applicant: Nabors Drilling Technologies USA, Inc., Houston, TX (US)

(72) Inventor: Christopher Magnuson, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 16/938,692

(22) Filed: Jul. 24, 2020

(65) Prior Publication Data

US 2021/0025252 A1 Jan. 28, 2021

Related U.S. Application Data

(60) Provisional application No. 62/878,196, filed on Jul. 24, 2019.

(51) Int. Cl.
*E21B 19/16* (2006.01)
*E21B 17/042* (2006.01)

(52) U.S. Cl.
CPC .......... *E21B 19/164* (2013.01); *E21B 17/042* (2013.01)

(58) Field of Classification Search
CPC .... E21B 19/161; E21B 19/164; E21B 17/042; E21B 19/168
See application file for complete search history.

(56) References Cited

U.S. PATENT DOCUMENTS

| 3,122,211 A | 2/1964 | Wilson et al. |
| 5,205,671 A | 4/1993 | Handford |
| 6,253,845 B1 * | 7/2001 | Belik ............... E21B 19/168 166/77.51 |
| 7,000,502 B2 | 2/2006 | Belik |
| 7,665,533 B2 | 2/2010 | Hopwood et al. |
| 7,707,914 B2 | 5/2010 | Pietras et al. |
| 7,841,415 B2 | 11/2010 | Winter |
| 8,042,432 B2 | 10/2011 | Hunter et al. |
| 8,667,869 B2 | 3/2014 | Ge |
| 8,726,743 B2 | 5/2014 | Ruehmann et al. |
| 9,453,378 B2 | 9/2016 | Ge |
| 9,464,492 B2 | 10/2016 | Austerfjord et al. |
| 9,567,816 B2 | 2/2017 | Bertelsen |

(Continued)

FOREIGN PATENT DOCUMENTS

| BR | 200414141 A | 10/2006 |
| CA | 2537698 A1 | 3/2005 |
| CA | 2484053 A1 | 4/2005 |
| CA | 2507788 A1 | 11/2005 |
| CA | 2537698 C | 5/2009 |

(Continued)

*Primary Examiner* — Christopher J Sebesta
(74) *Attorney, Agent, or Firm* — Abel Schillinger, LLP

(57) ABSTRACT

A system with multiple spinners in a spinner assembly, each spinner comprising a drive shaft, a sleeve with arcuate segments surrounding the drive shaft, a first cap that receives a first end of the sleeve and a second cap that receives a second end of the sleeve, which secures the sleeve to the drive shaft. A system with two spinner subassemblies in a spinner assembly, and with a coupling assembly that moves the subassemblies a same distance in opposite directions relative to a center axis of the spinner assembly. A method can include securing multiple arcuate segments of the sleeve to a drive shaft of the spinner by inserting a first end of the sleeve into a first recess of a first cap and inserting a second end of the sleeve into a second recess of a second cap.

20 Claims, 20 Drawing Sheets

(56) References Cited

U.S. PATENT DOCUMENTS

| | | |
|---|---|---|
| 10,309,170 B2 | 6/2019 | Bourgeois et al. |
| 10,422,450 B2 | 10/2019 | Ruehmann et al. |
| 10,648,253 B2 | 5/2020 | Kaasin |
| 2005/0056122 A1* | 3/2005 | Belik .................. E21B 19/161 81/57.16 |
| 2005/0076744 A1 | 4/2005 | Pietras et al. |
| 2005/0077743 A1 | 4/2005 | Pietras et al. |
| 2006/0248984 A1 | 11/2006 | Ge |
| 2013/0305884 A1 | 11/2013 | Dobush |
| 2014/0116687 A1 | 5/2014 | Ruehmann |
| 2014/0245867 A1* | 9/2014 | Ge .................. E21B 19/168 81/57.15 |
| 2015/0167409 A1* | 6/2015 | Gerwing .............. E21B 19/164 81/57.34 |
| 2015/0240582 A1 | 8/2015 | Bansal et al. |
| 2015/0252632 A1 | 9/2015 | Wentworth et al. |
| 2016/0333964 A1* | 11/2016 | Scekic .................. F16H 57/082 |
| 2017/0030181 A1 | 2/2017 | Thomas et al. |
| 2017/0342785 A1 | 11/2017 | Kaasin |
| 2018/0347294 A1 | 12/2018 | Vo |

FOREIGN PATENT DOCUMENTS

| | | |
|---|---|---|
| CA | 2507788 C | 1/2010 |
| CA | 2484053 C | 9/2010 |
| CA | 2869240 A1 | 10/2013 |
| CA | 2817551 A1 | 11/2013 |
| CA | 2869240 C | 6/2015 |
| CA | 3010169 A1 | 1/2020 |
| EP | 1660277 A2 | 5/2006 |
| EP | 1660277 A4 | 4/2013 |
| EP | 2825717 A1 | 1/2015 |
| GB | 2406867 A | 4/2005 |
| GB | 2414207 A | 11/2005 |
| GB | 2406867 B | 11/2006 |
| GB | 2414207 B | 11/2009 |
| MX | 2006002581 A | 6/2006 |
| NO | 200601182 L | 4/2006 |
| NO | 2006002581 A | 6/2006 |
| NO | 338849 B1 | 10/2016 |
| WO | 2005/026492 A2 | 3/2005 |
| WO | 2005/026492 A3 | 8/2005 |
| WO | 2013/155588 A1 | 10/2013 |

* cited by examiner

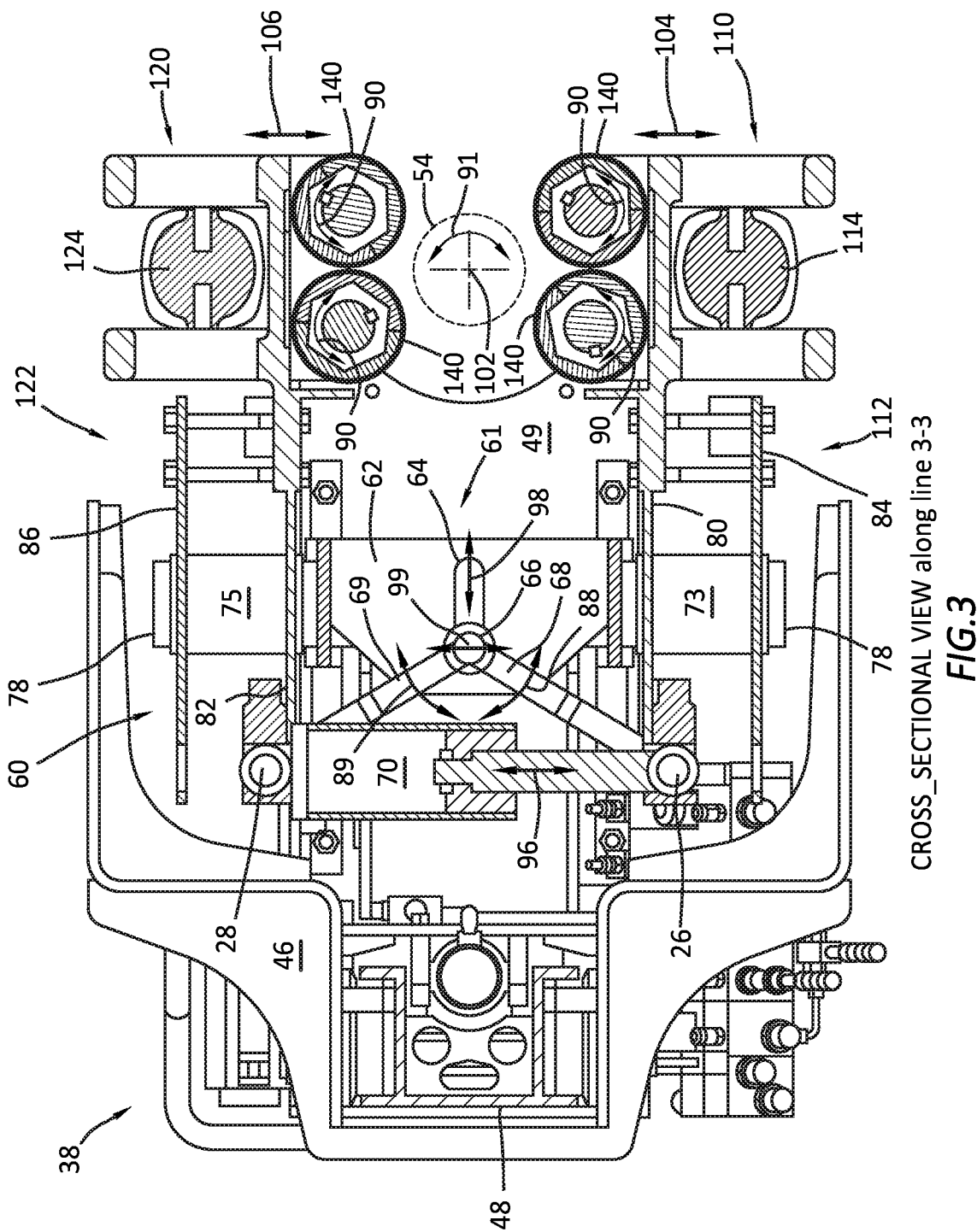
FIG.3 CROSS_SECTIONAL VIEW along line 3-3

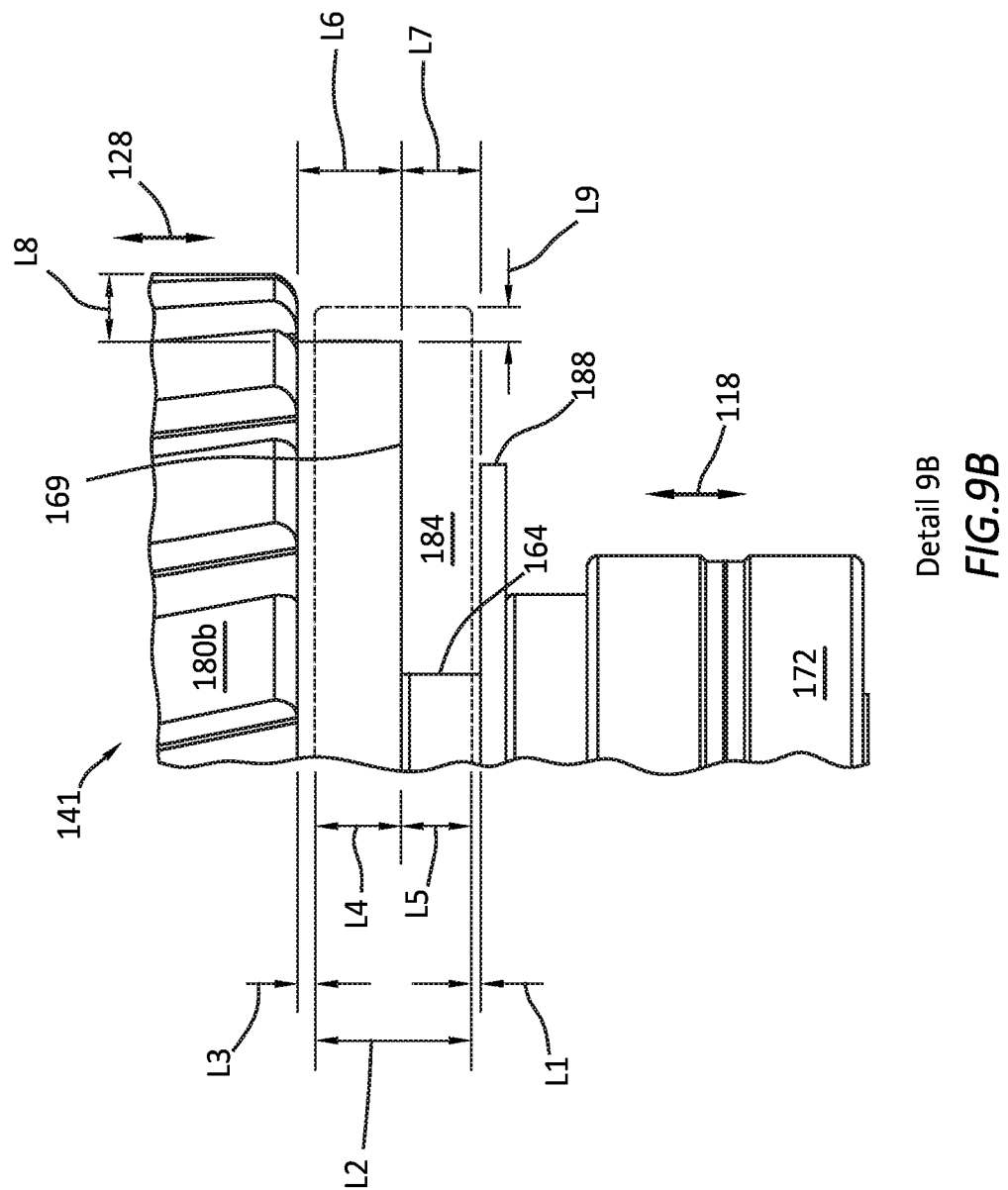

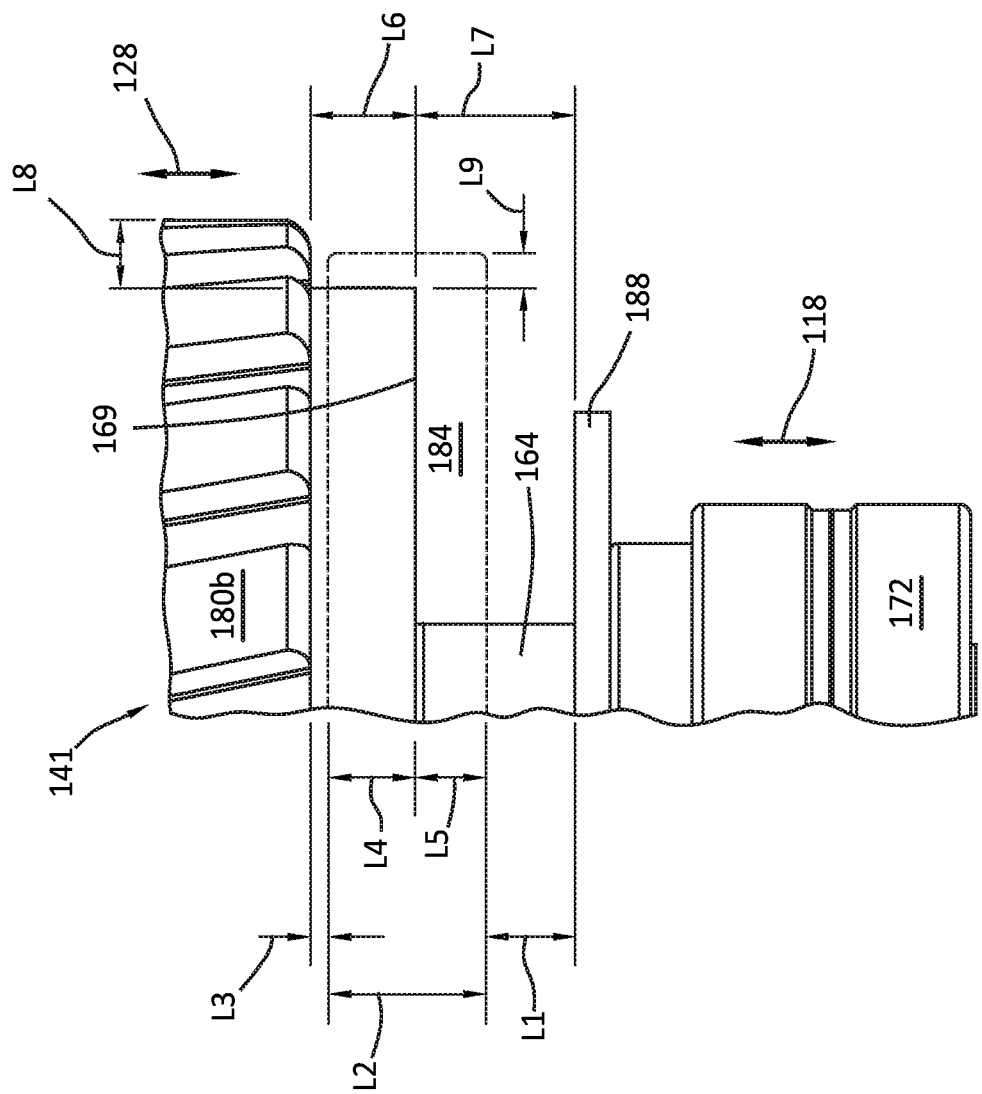

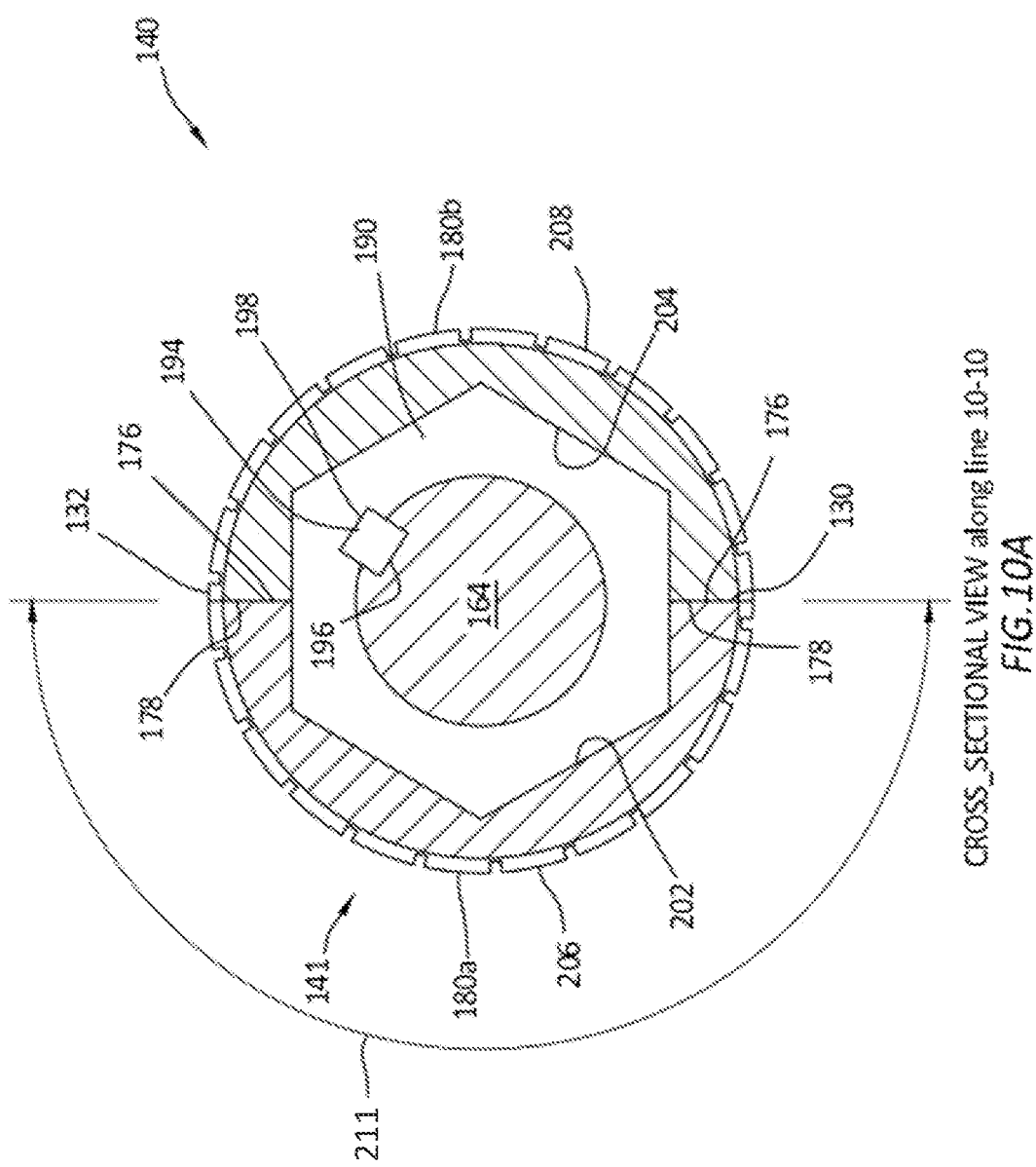

CROSS_SECTIONAL VIEW along line 10-10

CROSS_SECTIONAL VIEW along line 10-10

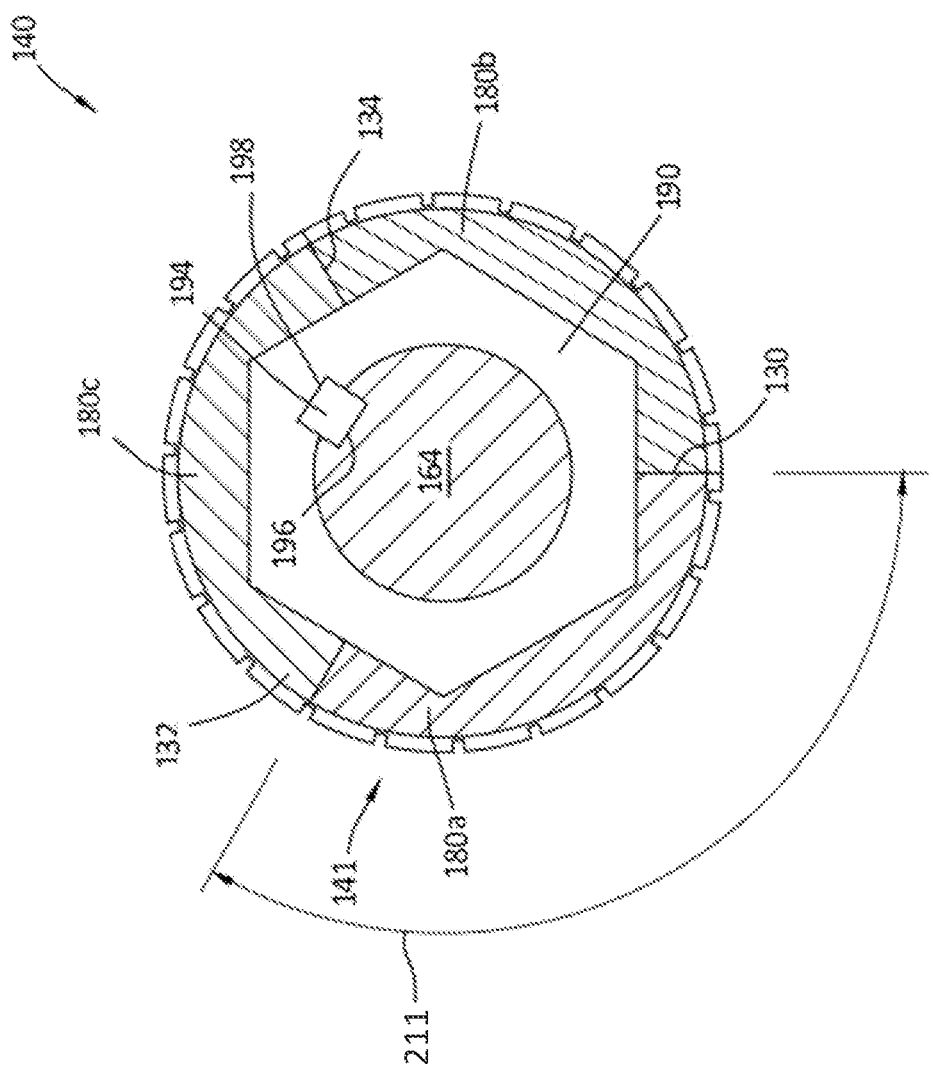

SPINNER WITH CONSUMABLE SLEEVE

CROSS REFERENCE TO RELATED APPLICATION(S)

This application claims priority under 35 U.S.C. § 119(e) to U.S. Patent Application No. 62/878,196, entitled "SPINNER WITH CONSUMABLE SLEEVE," by Christopher MAGNUSON, filed Jul. 24, 2019, which application is assigned to the current assignee hereof and incorporated herein by reference in its entirety.

BACKGROUND

Embodiments of the present disclosure relate generally to the field of drilling and processing of wells. In particular, present embodiments relate to a system and method for operating robotic systems during subterranean operations. More particularly, present embodiments relate to replaceable components for spinners in an iron roughneck to reduce down time of the robotic systems during the subterranean operations.

When a rig is tripping in a tubular string into a wellbore, an iron roughneck can be used to connect tubulars at their threaded ends and wrench the connection to a desired torque to maintain the connection. The connection may require rotating one tubular relative to the other tubular to thread the ends together (e.g. pin end being threaded into a box end). This "spinning" can be performed by a spinner assembly of the iron roughneck. When the ends have been threaded together (i.e. tubulars connected), wrench assemblies of the iron roughneck can be used to clamp the tubulars and torque the tubulars relative to each other to obtain the desired torque for the tubular connection.

When a rig is tripping out a tubular string from a wellbore, an iron roughneck can be used to disconnect tubulars at their threaded ends by applying a desired torque and "breaking" (or releasing) a connection between the tubulars with one of the tubulars being spun off (e.g. unthreaded from) the other tubular. Spinning the tubular off the other tubular may require rotating one tubular relative to the other tubular to unthread the ends (e.g. pin end being unthreaded from a box end). Again, this "spinning" can be performed by a spinner assembly of the iron roughneck. When the ends have been unthreaded (i.e. tubulars disconnected), a pipe handler can move the tubular, which was released from the tubular string, to a storage location on or off the rig.

In both the tripping in or tripping out, the iron roughneck can engage and rotate tubulars to thread or unthread the tubulars. As mentioned above, some iron roughnecks can use the spinner assembly to engage a tubular body of one of the tubulars being connected or disconnected and rotate the tubular at a faster speed than the wrench assemblies. The wrench assemblies (or clamping mechanisms) are included in a torque wrench assembly and are used to torque and untorque tubular connections. The spinner assembly can have a plurality of spinners, each of which can be cylindrically shaped with a gripping surface on its outer perimeter. The iron roughneck can move the spinners into and out of engagement with the tubular, with engagement of the tubular being provided by an outer gripping surface of each spinner that can grip the body of the tubular and transmit rotational motion of the spinner to the tubular body, thereby spinning the tubular. Over time, these gripping surfaces can become worn thereby causing the spinning assembly to slip on the tubular body and reduce the amount of rotational force that is applied to the tubular body. Continued use of the spinners can degrade performance of the gripping surfaces to a point that the spinner assembly may fail to perform the task of connecting or disconnecting tubulars.

Therefore, spinners can be seen as consumables that are replaced periodically to maintain the performance of the spinner assembly. However, replacement of the spinners generally requires disassembly of the spinner assembly to remove and replace the cylindrically shaped spinners. Some spinner assemblies may allow a subassembly, containing a plurality of spinners, to be removed, where the spinners in the subassemblies can be replaced off-line while the rig continues the subterranean operation. However, this can require spare subassemblies to be available to support the removal and replacement of the subassemblies. Disassembling these subassemblies off line to remove and replace the worn spinners can still be time consuming. Generally, drive shafts are integral to the spinners, with the disassembly requiring dismantling a drive train of the sub-assembly. Since this activity is performed periodically, reducing this disassembly time, even though it may be off line from rig operations, can still free up time for operators to perform other tasks.

Therefore, improvements of robotic rig systems are continually needed, and particularly improvements for spinner assemblies of iron roughnecks used in support of subterranean operations.

SUMMARY

In accordance with an aspect of the disclosure, a system for conducting subterranean operations can include a spinner assembly with a plurality of spinners. Each spinner can include a drive shaft that extends longitudinally through the spinner, a sleeve that surrounds the drive shaft, with the sleeve comprising arcuate segments, and a first cap that is configured to receive a first end of the sleeve.

In accordance with another aspect of the disclosure, a system for conducting subterranean operations can include a spinner assembly comprising first and second subassemblies disposed on opposites sides of a center axis of the spinner assembly, with each of the first and second subassemblies comprising a plurality of spinners. The spinner assembly can also include an actuator and a coupling assembly that couples that actuator to the first and second subassemblies, such that movement of the actuator by a first distance moves that first subassembly a second distance relative to the center axis and moves the second subassembly a third distance relative to the center axis, with the second distance being substantially equal to the third distance and in an opposite direction relative to the third distance.

In accordance with another aspect of the disclosure, a method for conducting a subterranean operation can include securing a plurality of arcuate segments of a sleeve to a drive shaft of a spinner in a spinner assembly, by inserting a first end of the sleeve into a first recess of a first cap, thereby securing the plurality of arcuate segments to the drive shaft.

In accordance with an aspect of the disclosure, a system for conducting subterranean operations can include a spinner assembly comprising a plurality of spinners. Each spinner can include a sleeve with a plurality of arcuate segments, with each one of the plurality of arcuate segments forming a portion of a first radially reduced portion of the sleeve at a first end of the sleeve. The spinner assembly can further include a first cap that is configured to receive the first radially reduced portion and restrict radial movement of the plurality of arcuate segments away from each other.

In accordance with an aspect of the disclosure, a system for conducting subterranean operations can include a spinner assembly with a plurality of spinners. Each spinner can include a sleeve with a plurality of arcuate segments where each one of the plurality of arcuate segments forms a portion of a first radially reduced portion of the sleeve at a first end of the sleeve, a first cap that is configured to receive the first radially reduced portion, and a thrust bearing. The spinner assembly can further include a top plate, with the thrust bearing positioned between the first cap and the top plate, and a bottom plate positioned parallel with the top plate and spaced away from the top plate by a first length, with the plurality of spinners rotationally coupled to the top plate and the bottom plate, and the plurality of spinners being disposed between the top plate and the bottom plate, where the first length confines the plurality of arcuate segments axially.

In accordance with an aspect of the disclosure, a system for conducting subterranean operations can include a spinner assembly with a plurality of spinners. Each spinner can include a sleeve with a plurality of arcuate segments, and a first cap configured to receive a first end of the sleeve. The spinner assembly can further include a top plate, with the thrust bearing positioned between the first cap and the top plate, and a bottom plate positioned parallel to the top plate and selectively spaced away from the top plate a first length or a second length, where the first length axially confines the first caps on the respective first ends when the respective first ends of the sleeves are received by the respective first caps, and where the first length radially confines a respective plurality of arcuate segments to the respective spinner.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein:

FIG. 3 is a representative partial cross-sectional view of the roughneck along line 3-3 as indicated in FIG. 2B, in accordance with certain embodiments;

FIG. 9B is a representative detailed view of a detail area 9B of the spinner indicated in FIG. 9A, in accordance with certain embodiments;

FIG. 9C is a representative detailed view of a detail area 9C of the spinner indicated in FIG. 9A, in accordance with certain embodiments;

FIG. 10A is a representative partial cross-sectional view of the spinner of FIG. 9A along line 10-10 as indicated in FIG. 9A, in accordance with certain embodiments;

FIG. 10D is another representative partial cross-sectional view of the spinner of FIG. 9A along line 10-10 as indicated in FIG. 9A, in accordance with certain embodiments;

DETAILED DESCRIPTION

Present embodiments provide a robotic system (i.e. iron roughneck) with electrical components that can operate in hazardous zones (such as a rig floor) during subterranean operations. The robotic system can include a robot and a sealed housing that moves with the robot, with electrical equipment and/or components contained within the sealed housing. It should be understood that it is not a requirement that the robotic system include electrical components. The robotic system can include components that are powered by different energy sources such as electrical, hydraulic, mechanical, pneumatic, photonic, or combinations thereof. The aspects of various embodiments are described in more detail below.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Figure 1A:
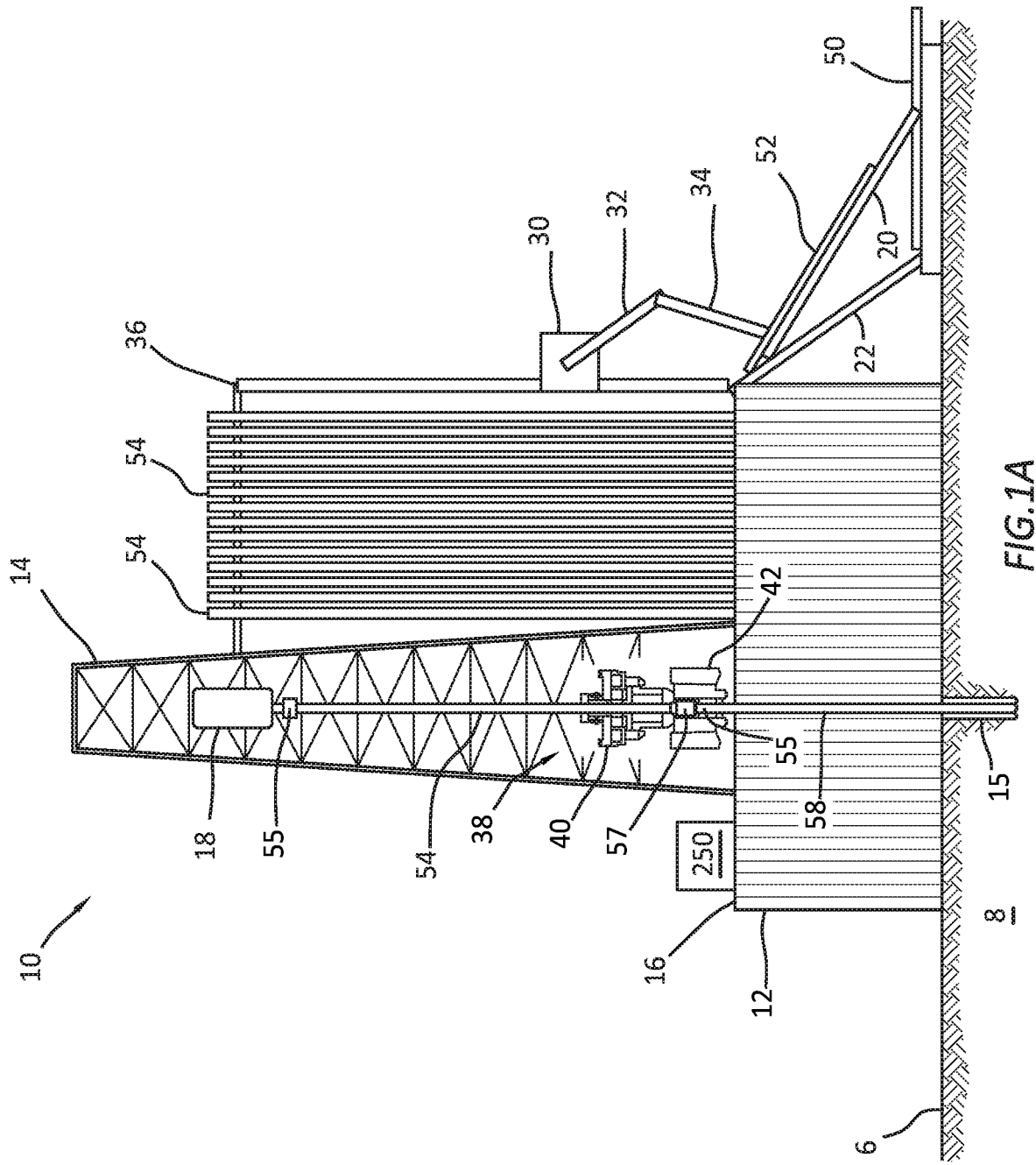
FIG. 1A is a representative simplified front view of a rig being utilized for a subterranean operation, in accordance with certain embodiments.

FIG. 1A is a representative simplified front view of a rig being utilized for a subterranean operation (e.g. tripping in or out a tubular string to or from a wellbore), in accordance with certain embodiments. The rig 10 can include a platform 12 with a rig floor 16 and a derrick 14 extending up from the rig floor 16. The derrick 14 can provide support for hoisting the top drive 18 as needed to manipulate tubulars. A catwalk 20 and V-door ramp 22 can be used to transfer horizontally stored tubular segments 50 to the rig floor 16. A tubular segment 52 can be one of the horizontally stored tubular segments 50 that is being transferred to the rig floor 16 via the catwalk 20. A pipe handler 30 with articulating arms 32, 34 can be used to grab the tubular segment 52 from the catwalk 20 and transfer the tubular segment 52 to the top drive 18, the fingerboard 40, the wellbore 15. etc. However, it is not required that a pipe handler 30 be used on the rig 10. The top drive 18 can transfer tubulars directly between the catwalk 20 and the top drive 18 (e.g. using an elevator coupled to the top drive). As used herein, "tubular" refers to an elongated cylindrical tube and can include any of the tubulars manipulated around the rig 10, such as tubular segments 50, 52, tubular stands, tubulars 54, and tubular string 58, but not limited to the tubulars shown in FIG. 1A. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

The tubular string 58 can extend into the wellbore 15, with the wellbore 15 extending through the surface 6 into the subterranean formation 8. When tripping the tubular string 58 into the wellbore 15, tubulars 54 are sequentially added to the tubular string 58 to extend the length of the tubular string 58 into the earthen formation 8. FIG. 1A shows a land-based rig. However, it should be understood that the principles of this disclosure are equally applicable to off-shore rigs where "off-shore" refers to a rig with water between the rig floor and the earth surface 6.

When tripping the tubular string 58 out of the wellbore 15, tubulars 54 are sequentially removed from the tubular string 58 to reduce the length of the tubular string 58 in the wellbore 15. The pipe handler 30 can be used to deliver the tubulars 54 to a well center on the rig floor 16 in a vertical orientation and hand the tubulars 54 off to an iron roughneck 38 or a top drive 18. The pipe handler 30 can also be used to remove the tubulars 54 from the well center in a vertical orientation and receive the tubulars 54 from the iron roughneck 38 or a top drive 18. The iron roughneck 38 can make a threaded connection between a tubular 54 being added and the tubular string 58. A spinner assembly 40 can engage a body of the tubular 54 to spin a pin end 57 of the tubular 54 into a threaded box end 55 of the tubular string 58, thereby threading the tubular 54 into the tubular string 58. The torque wrench assembly 42 can provide a desired torque to the threaded connection, thereby completing the connection. This process can be reversed when the tubulars 54 are being removed from the tubular string 58.

A rig controller 250 can be used to control the rig 10 operations including controlling various rig equipment, such as the pipe handler 30, the top drive 18 and the iron roughneck 38. The rig controller 250 can control the rig equipment autonomously (e.g. without periodic operator interaction), semi-autonomously (e.g. with limited operator interaction such as initiating a subterranean operation, adjusting parameters during the operation, etc.), or manually (e.g. with the operator interactively controlling the rig equipment via remote control interfaces to perform the subterranean operation). A portion of the rig controller 250 can also be distributed around the rig 10, such as having a portion of the rig controller 250 in the pipe handler 30 and the iron roughneck 38.

Figure 1B:
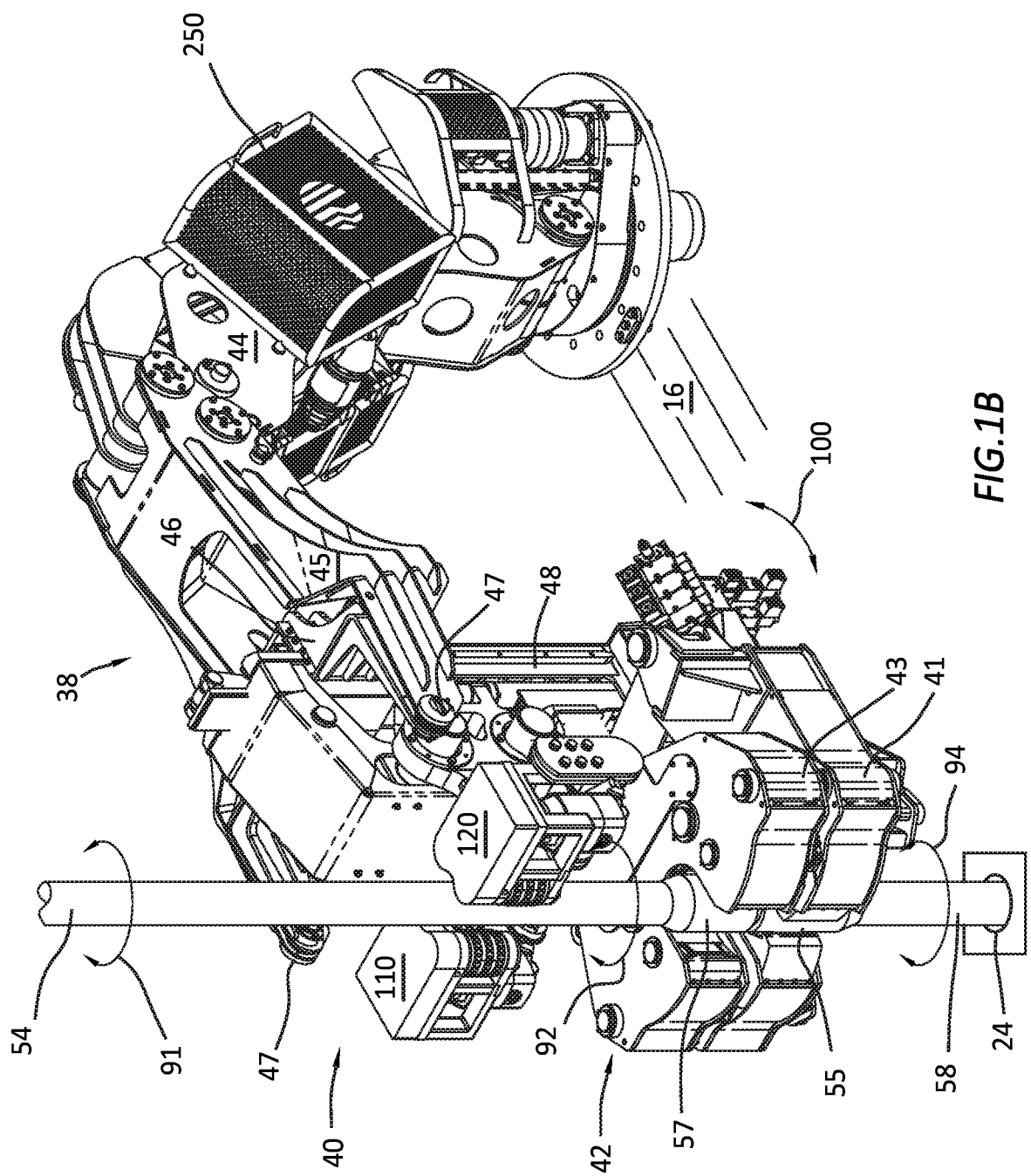
FIG. 1B is a representative perspective view of an iron roughneck with a spinner assembly on a rig floor, in accordance with certain embodiments.

FIG. 1B is a representative perspective view of an iron roughneck 38 with a spinner assembly 40 on a rig floor 16 with a body of the tubular 54 engaged with the spinner assembly 40 and the torque wrench assembly 42 gripping both the box end 55 of the tubular string 58 and the pin end 57 of the tubular 54. The iron roughneck 38 can include a robot arm 44 that supports the iron roughneck 38 from the rig floor 16. The robotic arm 44 can include a support arm 45 that can couple to a frame 48 via a frame arm 46. The support arm 45 can support and lift the frame 48 of the iron roughneck 38 via the frame arm 46, which can be rotationally coupled to the support arm 45 via the pivots 47. The frame 48 can provide structural support for the spinner assembly 40 and the torque wrench assembly 42. The robotic arm 44 can move the frame 48 from a retracted position (i.e. away from the well center 24) to an extended position (i.e. toward the well center 24) and back again as needed to provide support for making or breaking connections in the tubular string 58. In the extended position of the frame 48, the spinner assembly 40 and the torque wrench assembly 42 can engage the tubular 54 and the tubular string 58, respectively.

The top drive 18 (not shown) can rotate the tubular string 58 in either clockwise or counter-clockwise directions as shown by arrows 94. The tubular string 58 is generally rotated in a direction that is opposite the direction used to unthread tubular string 58 connections. When a connection is to be made or broken, a first wrench assembly 41 of the torque wrench assembly 42 can grip the box end 55 of the tubular string 58. The first wrench assembly 41 can prevent further rotation of the tubular string 58 by preventing rotation of the box end 55 of the tubular string 58.

If a connection is being made, the spinner assembly 40 can engage the tubular 54 at a body portion, which is the portion of the tubular between the pin end 57 and box end 55 of the tubular 54. With the pin end 57 of the tubular 54 engaged with the box end 55 of the tubular string 58, the spinner assembly 40 can rotate the tubular 54 in a direction (arrows 91) to thread the pin end 57 of the tubular 54 into the box end 55 of the tubular string 58, thereby forming a connection of the tubular 54 to the tubular string 58. When a pre-determined torque of the connection is reached by the spinner assembly 40 rotating the tubular 54 (arrows 91), then a second wrench assembly 43 of the torque wrench assembly 42 can grip the pin end 57 of the tubular 54 and rotate the pin end 57. By rotating the second wrench assembly 43 relative to the first wrench assembly 41 (arrows 92), the torque wrench assembly 42 can torque the connection to a desired torque, thereby completing the connection of the tubular 54 to the tubular string 58. The iron roughneck can then be retracted from the well center 24 and the subterranean operation can continue.

If a connection is being broken, the spinner assembly 40 can engage the tubular 54 at the body portion. The first wrench assembly 41 can grip the box end 55 of the tubular string 58 and the second wrench assembly 43 can grip the pin end 57 of the tubular 54. By rotating the pin end 57 of the tubular 54 relative to the box end 55 of the tubular string 58, the previously torqued connection can be broken loose. After the connection is broken, the spinner assembly 40 can rotate the tubular 54 relative to the tubular string 58 (arrows 91), thereby releasing the tubular 54 from the tubular string 58. The tubular 54 can then be removed from the well center by the top drive or pipe handler (or other means) and the iron roughneck retracted from the well center 24 to allow the top drive access to the top end of the tubular string 58.

The position of the spinner assembly 40 and torque wrench assembly 42 relative to the rig floor 16 (and thus the tubular string 58) can be controlled by the controller 250 via the robotic arm 44 and the frame arm 46, which is moveable relative to the frame 48. The controller 250 or other controllers, via the robotic arm 44, can manipulate the frame 48 by lifting, lowering, extending, retracting, rotating the arm, etc. The robotic arm 44 can be coupled to the frame 48 via the support arm 45 which can be rotatably coupled to the frame arm 46 via pivots 47. The frame 48 can move up and down relative to the frame arm 46 to raise and lower the spinner assembly 40 and torque wrench assembly 42 as needed to position the assemblies 40, 42 relative to the tubular string 58. The frame 48 can also tilt (arrows 100) via pivots 47 to longitudinally align a center axis of the assemblies 40, 42 relative to the tubular string 58.

Figure 1C:
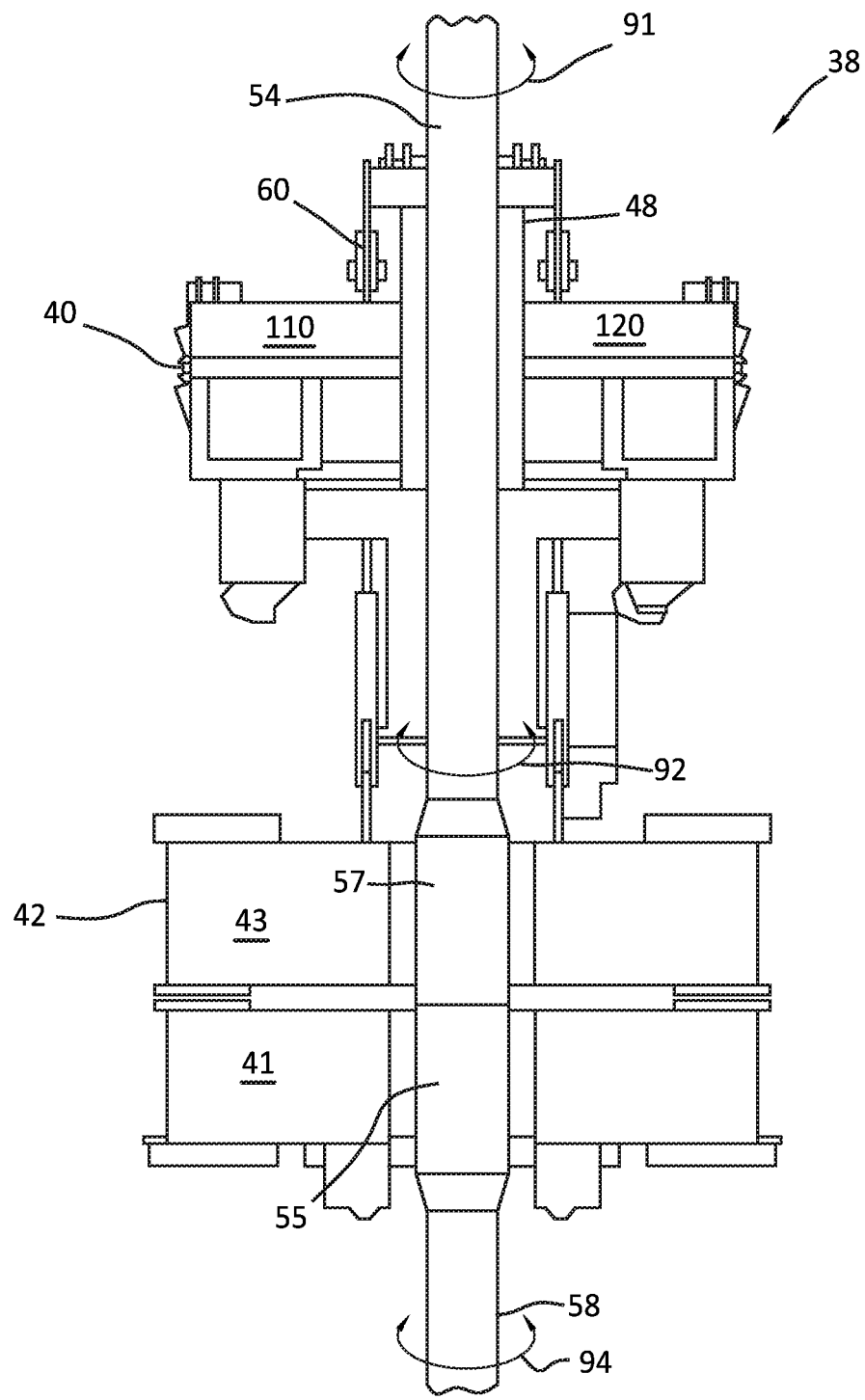
FIG. 1C is a representative front view of an iron roughneck engaging a tubular string, in accordance with certain embodiments.

FIG. 1C is a representative front view of an iron roughneck 38 engaging a tubular string 58. As described above regarding FIG. 1B, the spinner assembly 40 and the torque wrench assembly 42 can be structurally supported by the frame 48. The torque wrench assembly 42 can include a first wrench assembly 41 that can grip an end of the tubular string 58 (e.g. the box end 55), thereby preventing rotation of the tubular string 58 (arrows 94). The second wrench assembly 43 can grip an end of the tubular 54 (e.g. the pin end 57) and torque the connection (arrows 92) relative to the tubular string 58 as needed to make or break the connection.

The spinner assembly 40 can include spinner subassemblies 110, 120 that can cooperate with each other to engage and rotate the tubular 54. The spinner assembly 40 can include a coupling assembly 60 that couples the spinner subassemblies 110, 120 together and couples the spinner subassemblies 110, 120 to the frame 48. The coupling assembly 60 can operate to move the spinner subassemblies 110, 120 toward or away from each other to engage or disengage the spinner subassemblies 110, 120 with the tubular 54.

Figure 2A:
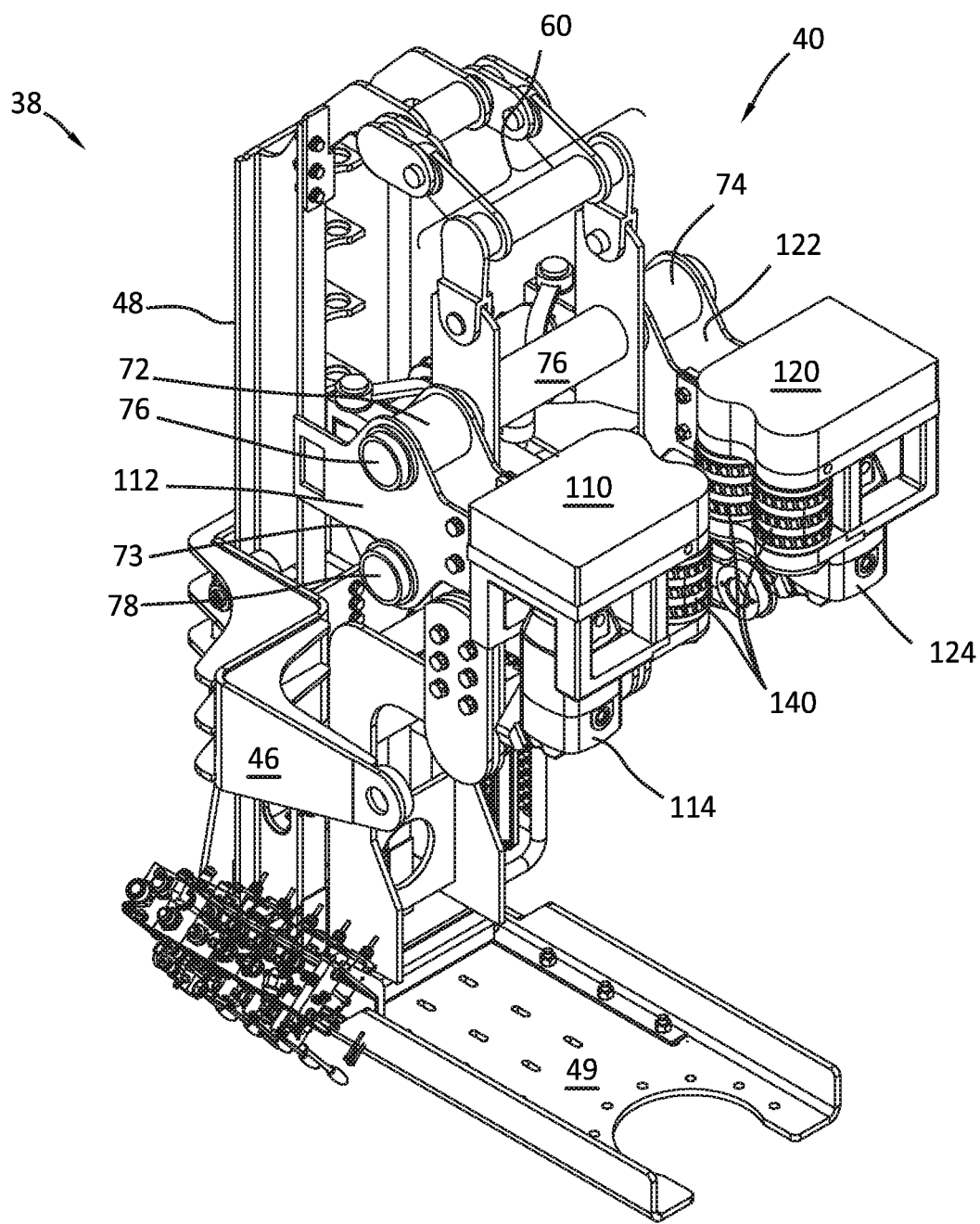
FIG. 2A is a representative perspective view of an iron roughneck with a torque wrench assembly portion removed for clarity, in accordance with certain embodiments.

FIG. 2A is a representative perspective view of an iron roughneck 38 with the torque wrench assembly 42 portion removed for clarity. The iron roughneck 38 can include the frame 48 that supports the spinner assembly 40 and the torque wrench assembly 42 (not shown). A base 49 of the frame 48 can be used to support the torque wrench assembly 42.

The coupling assembly 60 can include guide tubes 76, 78. Bracket assembly 112 can mount the spinner subassembly 110 to the guide tubes 76, 78 via a pair of sleeves 72, 73. The sleeve 72 can be coaxially mounted over one end of the guide tube 76, and the sleeve 73 can be coaxially mounted over one end of the guide tube 78. Bracket assembly 122 can mount the spinner subassembly 120 to the guide tubes 76, 78 via a pair of sleeves 74, 75 (sleeve 75 not shown, see FIG. 3). The sleeve 74 can be coaxially mounted over another end of the guide tube 76, and the sleeve 75 can be coaxially mounted over another end of the guide tube 78. The sleeves 72, 74 and sleeves 73, 75 are configured to slide along the respective guide tubes 76, 78.

The bracket assembly 112 can be fixedly attached to the spinner subassembly 110, such that the spinner subassembly 110 moves with the sleeves 72, 73 when the sleeves 72, 73 are slide along the respective guide tubes 76, 78. The bracket assembly 122 can be fixedly attached to the spinner subassembly 120, such that the spinner subassembly 120 moves with the sleeves 74, 75 when the sleeves 74, 75 are slide along the respective guide tubes 76, 78. Therefore, when the sleeves 72, 73 are moved toward the sleeves 74, 75 along the respective guide tubes 76, 78, then the spinner subassemblies 110, 120 are moved toward each other. When the sleeves 72, 73 are moved away from the sleeves 74, 75 along the respective guide tubes 76, 78, then the spinner subassemblies 110, 120 are moved away from each other. The movements of the spinner subassemblies 110, 120 are parallel to the movements of the sleeves 72, 73, 74, 75, and offset from the movements of the sleeves 72, 73, 74, 75. Therefore, the travel directions for the subassemblies 110, 120, and the travel directions for the sleeves 72, 73, 74, 75 are parallel to each other, but spaced away from each other. In other words, movements of the sleeves 72, 73, 74, 75 are not in line with movements of the subassemblies 110, 120.

Each spinner subassembly 110, 120 can include a motor 114, 124, respectively, and multiple spinners 140. The motor 114, 124 can rotate respective spinners 140, and when the spinner subassemblies 110, 120 are engaged with the tubular 54, rotation of the spinners 140 can cause the tubular 54 to rotate.

Figure 2B:
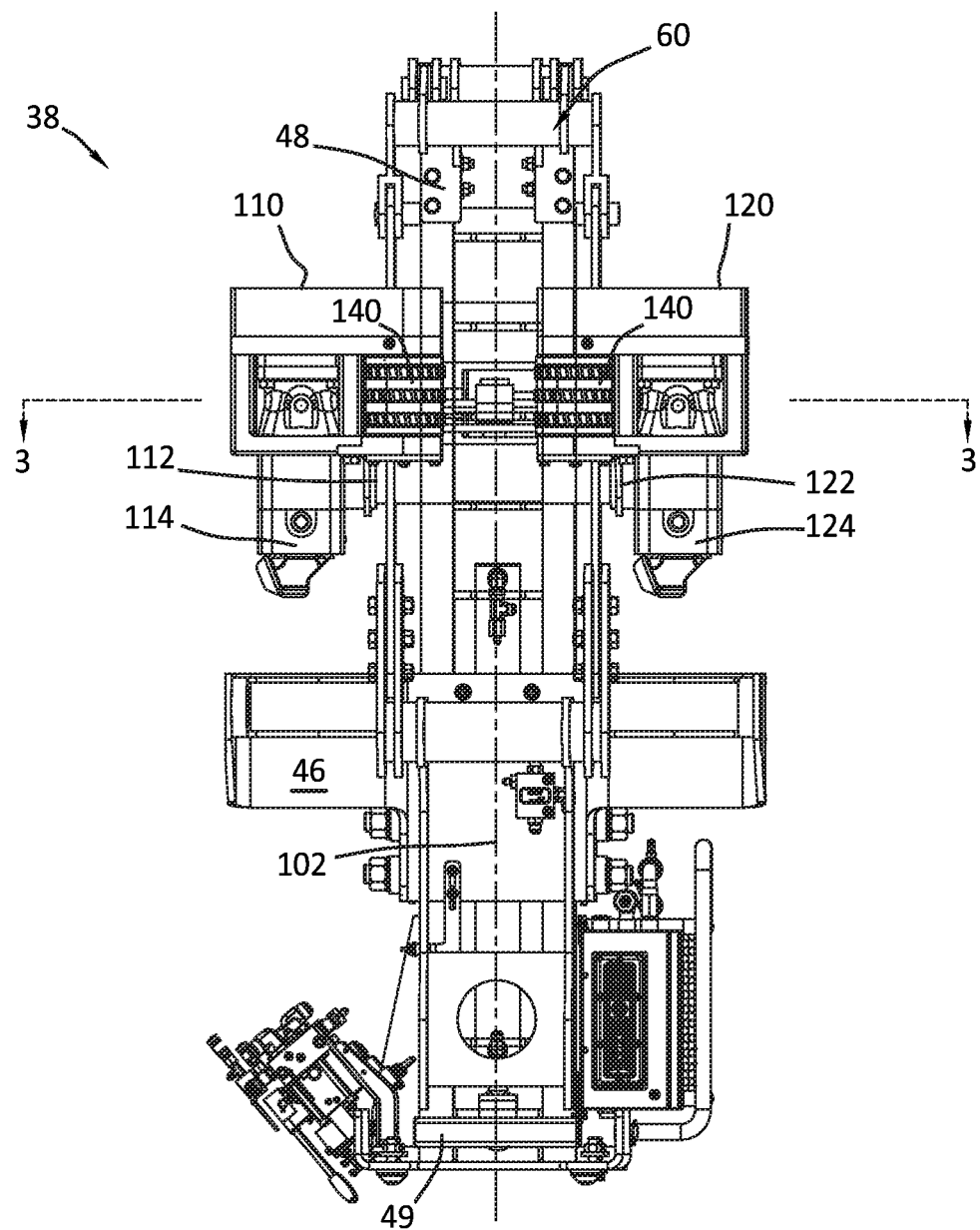
FIG. 2B is a representative front view of an iron roughneck with a torque wrench assembly portion removed for clarity, in accordance with certain embodiments.

FIG. 2B is a representative front view of an iron roughneck 38 with a torque wrench assembly portion 42 removed for clarity. The spinner subassemblies 110, 120 are positioned on opposite sides of a center axis 102 of the spinner assembly 40, with the center axis 102 being positioned between the spinner subassemblies 110, 120.

FIG. 3 is a representative partial cross-sectional view of the iron roughneck 38 as seen along line 3-3, which is indicated in FIG. 2B. The frame arm 46 can be coupled to the frame 48 such that the frame 48 can be suspended by the frame arm 46. The spinner subassemblies 110, 120 can be positioned on opposite sides of an axis 102 where a tubular 54 can be aligned when the spinner assembly 40 is being used to make or break a connection to the tubular string 58. A possible position of the tubular 54 is indicated by the dashed outline of a tubular 54 cross-section. The spinner assembly 40 can be used to rotate the tubular 54 (arrows 91).

The spinner subassembly 110 can include two spinners 140 that are rotationally linked to the motor 114, such that the spinners 140 rotate (arrows 90) with the motor 114, when a drive shaft of the motor is rotated. The spinner subassembly 110 can be coupled to the coupling assembly 60 via the bracket assembly 112, which can include brackets 80, 84 and sleeves 72, 73. The bracket 80 can be fixedly attached to the spinner subassembly 110 as well as to the sleeves 72, 73 (see FIGS. 2A and 3), where the sleeves 72, 73 are coaxially and slidably disposed on respective guide tubes 76, 78. The sleeves 72, 73 restrict the motion (arrows 104) of the spinner subassembly 110 such that the motion 104 is parallel to the motion 96 of the actuator 70. As the actuator 70 extends it applies a force to the bracket 80, which transfers the force to the sleeves 72, 73 and to the spinner subassembly 110. Since the sleeves 72, 73 are coaxially disposed on the respective guide tubes 76, 78, the sleeves substantially prevent rotation of the bracket 80 relative to the guide tubes 76, 78 in any direction and cause the sleeves 72, 73 to move along the respective guide tubes 76, 78. Since the bracket 80 does not substantially rotate relative to the actuator 70 or the guide tubes 76, 78, the spinner subassembly 110 is moved in a direction (arrows 104) that is parallel to the motion of the actuator 70 (arrows 96). An optional bracket 84 can be fixedly attached to the sleeves 72, 73 and be spaced away from the bracket 80. The bracket 84 can provide support for managing cables and tubing that are connected to the spinner subassembly 110 during operation.

The spinner subassembly 120 can include two spinners 140 that are rotationally linked to the motor 124, such that the spinners 140 rotate (arrows 90) with the motor 124, when a drive shaft of the motor is rotated. The spinner subassembly 120 can be coupled to the coupling assembly 60 via the bracket assembly 122, which can include brackets 82, 86 and sleeves 74, 75. The bracket 82 can be fixedly attached to the spinner subassembly 120 as well as to the sleeves 74, 75 (see FIGS. 2A and 3), where the sleeves 74, 75 are coaxially and slidably disposed on respective guide tubes 76, 78. The sleeves 74, 75 restrict the motion (arrows 106) of the spinner subassembly 120 such that the motion 106 is parallel to the motion 96 of the actuator 70. As the actuator 70 extends it applies a force to the bracket 82, which transfers the force to the sleeves 74, 75 and to the spinner subassembly 120. Since the sleeves 74, 75 are coaxially disposed on the respective guide tubes 76, 78, the sleeves substantially prevent rotation of the bracket 82 relative to the guide tubes 76, 78 in any direction and cause the sleeves 74, 75 to move along the respective guide tubes 76, 78. Since the bracket 82 does not substantially rotate relative to the actuator 70 or the guide tubes 76, 78, the spinner subassembly 120 is moved in a direction (arrows 106) that is parallel to the motion of the actuator 70 (arrows 96). An optional bracket 86 can be fixedly attached to the sleeves 74, 75 and be spaced away from the bracket 82. The bracket 86 can provide support for managing cables and tubing that are connected to the spinner subassembly 120 during operation.

The coupling assembly 60 can include a guide mechanism 61 that substantially equalizes the movement of the spinner subassemblies 110, 120. The guide mechanism 61 can cause the distance of the movement 104 of the spinner subassembly 110 to be substantially equal and opposite to the distance of the movement 106 of the spinner subassembly 120. The distance of movement 96 of the actuator 70 is substantially equal to the combined distance of the movement 104 and the movement 106.

The guide mechanism 61 can include a guide plate 62, a guide channel 64, a guide pin 66, and guide links 68, 69. The guide plate 62 can be fixedly attached to brackets of the coupling assembly 60. The guide channel 64 is formed in the guide plate 62 and extends toward the center axis 102 and can be substantially parallel to the brackets 80, 82. The guide pin 66 can be slidably attached to the guide plate 62, such that the guide pin 66 slides back and forth in the guide channel 64. One end of each of the guide links 68, 69 can be pivotably attached to the guide pin 66, with the other end of each of the guide links 68, 69 being pivotably attached to opposite ends of the actuator 70. Therefore, one end of the guide link 68 can be pivotably attached to the pivot 26. The pivot 26 can also be pivotably attached to an end of the actuator 70. One end of the guide link 69 can be pivotably attached to the pivot 28. The pivot 28 can also be pivotably attached an opposite end of the actuator 70.

When the actuator 70 retracts, the guide links 68, 69 rotate in opposite directions (arrows 88, 89) around the guide pin 66 and toward each other. This forces the guide pin 66 to move (arrows 98) along the guide channel 64 away from the actuator 70. Since the guide channel 64 is positioned substantially in line with a middle of the actuator 70 and perpendicular to the actuation motion 96 of the actuator 70, the guide pin 66 and the guide links 68, 69 equalize the movement 104, 106 by each respective bracket 80, 82 toward the center axis 102. Since the bracket 80, 82 movements determine the movements of the respective spinner subassembly 110, 102, then the spinner subassemblies 110, 120 can urge a tubular 54 to align its longitudinal axis with the center axis 102. The spinner assembly 40 can align a longitudinal axis of the tubular 54 with the center axis 102, but this is not required for the spinner assembly 40 to perform its operational functions for making and breaking connections to the tubular string 58. The brackets 80, 82 are moved simultaneously in opposite directions toward the center axis 102 by substantially equal distances when the actuator 70 is retracted. Therefore, the spinner subassemblies 110, 102 are also moved simultaneously in opposite directions toward the center axis 102 by a substantially equal distance.

When the actuator 70 extends, the guide links 68, 69 rotate in opposite directions (arrows 88, 89) around the guide pin 66 and away from each other. This acts to force the guide pin 66 to move (arrows 98) along the guide channel 64 toward the actuator 70. Since the guide channel 64 is positioned substantially in line with a middle of the actuator 70 and perpendicular to the actuation motion 96, the guide pine 66 and the guide links 68, 69 equalize the movement 104, 106 by each respective bracket 80, 82 away from the center axis 102. Since the bracket 80, 82 movements determine the movements of the respective spinner subassembly 110, 102, then the spinner subassemblies 110, 120 can move away from engagement with a tubular 54 to allow removal of the tubular 54. The brackets 80, 82 are moved simultaneously in opposite directions away from the center axis 102 by substantially equal distances when the actuator 70 is extended. Therefore, the spinner subassemblies 110, 102 are also moved simultaneously in opposite directions away from the center axis 102 by a substantially equal distance.

Figure 4:
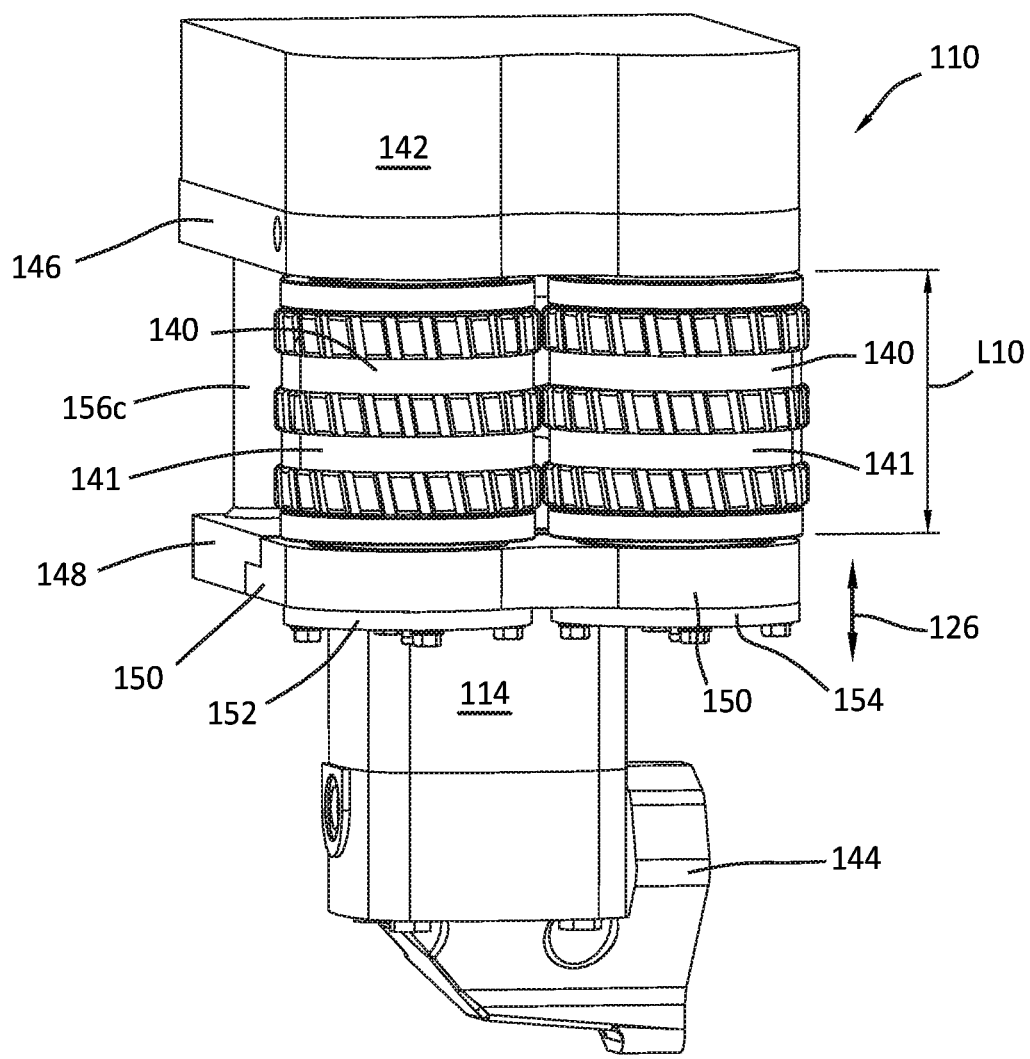
FIG. 4 is a representative perspective view of a spinner subassembly containing multiple spinners, in accordance with certain embodiments.
Figure 5:
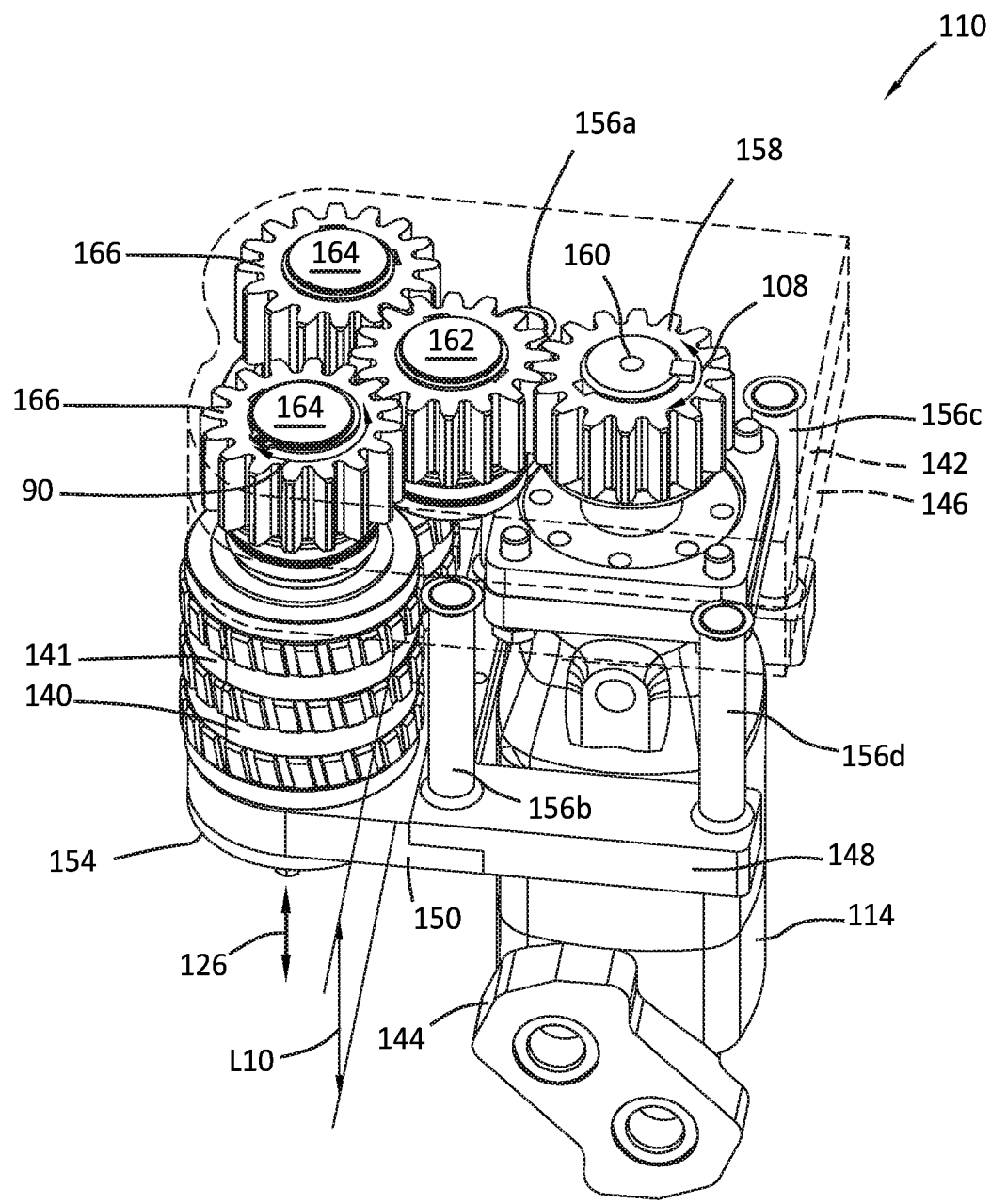
FIG. 5 is another representative perspective view of a spinner subassembly containing multiple spinners, the spinner subassembly having various translucent components for clarity, in accordance with certain embodiments.
Figure 6:
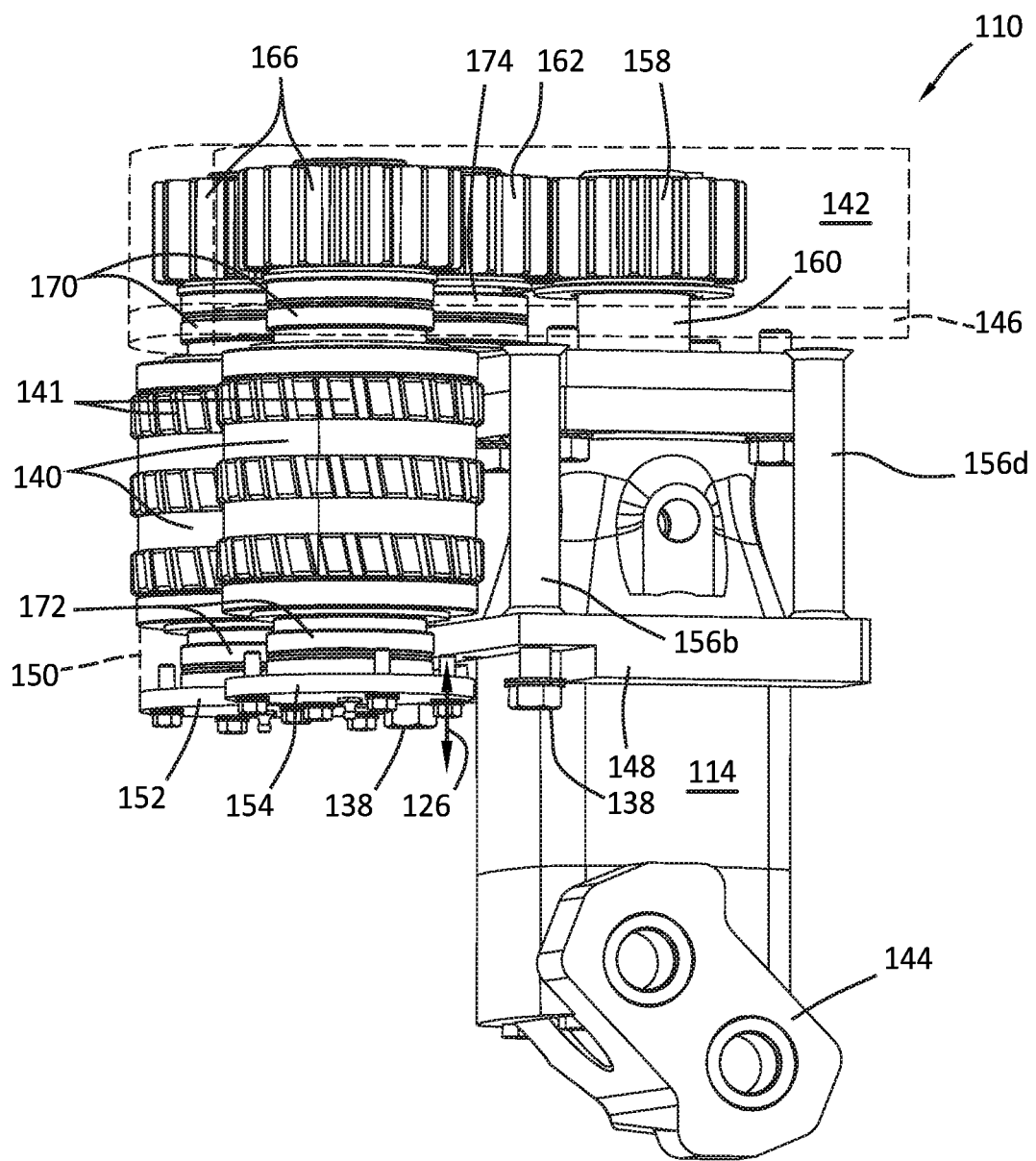
FIG. 6 is another representative perspective view of a spinner subassembly containing multiple spinners, the spinner subassembly having various translucent components for clarity, in accordance with certain embodiments.

The following discussion for FIGS. 4-6 is directed at the spinner subassembly 110, but the discussion is similarly applicable to the spinner subassembly 120, as well. FIG. 4 is a representative perspective view of a spinner subassembly 110 containing multiple spinners 140 as viewed from the center axis 102. A motor 114 can be mounted parallel to the spinners 140 in the spinner subassembly 110. The motor 114 can include an interface bracket 144 that provides a connection to an energy source (e.g. electrical, hydraulic, pneumatic, etc.) to power and control the motor 114. Two spinners 140 are mounted beside each other and in parallel with the motor 114. The spinners 140 can be rotatably mounted between an upper plate 146 and a lower plate which can be formed by two lower plates 148, 150. The lower plate 148 can be assembled to the upper plate via stand-offs 156a-d, with the stand-offs 156a-d having a length L10, which is generally the length needed to space the upper plate 146 from the lower plates 148, 150 to hold the spinners between the plates 146 and 148, 150. The lower plate 150 can include access plates 152, 154 that can be removed to provide access through the lower plate 150 to bearings on the lower end of the spinners 140.

The lower plate 150 can be lowered (arrows 126) relative to the upper plate 146 (and the lower plate 148) such that the distance from the upper plate 146 and the lower plate 150 is increased (e.g. greater than L10) to a point that the sleeves 141 on the spinners 140 can be replaced without removing the bottom plate 150 or the upper plate 146. When the sleeves 141 of one or more of the spinners are replaced, then the lower plate 150 can be raised (arrows 126) relative to the upper plate 146, such that the lower plate 150 is again engaged to the lower plate 148 and the spinners 140 are again confined between the upper plate 146 and the lower plate 150. A cover 142 can protect gears used to transmit rotational motion from a drive shaft of the motor 114 to the spinners 140.

FIG. 5 is another representative perspective view of a spinner subassembly 110 containing multiple spinners 140 as viewed from a rear of the spinner assembly 40. The cover 142, upper plate 146, and lower plate 150 are shown as translucent components to facilitate discussion related to other components of the spinner subassembly 110. The upper plate 146 can be spaced apart from the lower plate 148 by the stand-offs 156a-d, which can be fixedly attached to the upper and lower plates, 146, 148. The motor 114 can be removably attached to the bottom side of the upper plate 146, with a drive shaft 160 extending through the upper plate 146. A keyed gear 158 can be installed on an upper end of the drive shaft 160, with the drive shaft 160 configured to rotate the gear 158 as indicated by arrows 108. A gear 162 can be rotationally fixed to a post that is rotatably attached to the upper plate 146. The gear 162 can be positioned proximate the gear 158, such that rotational motion 108 of the gear 158 is transmitted to the gear 162, but the gear 162 will rotate in an opposite direction than the gear 158.

Each spinner 140 can include a drive shaft 164 with a keyed gear 166 installed on an upper end of the drive shaft 164. Each gear 166 is proximate to the gear 162 such that each gear engages the gear 162. Therefore, when the gear 162 is rotated, the rotation is transmitted to the gears 166, such that the gears 166 rotate in an opposite direction than the gear 162. Therefore, the gears 166 and the drive gear 158 can rotate in the same direction. Through the coupling of the gear 158 to the gear 162 and to the gears 166 causes the gears 166 to rotate (arrows 90) in a same rotational direction as the rotation (arrows 108) of the gear 158. The drive shaft 164 of each spinner 140 can transmit the rotation of the respective gear 166 to the respective spinner 140.

FIG. 6 is another representative perspective view of a spinner subassembly 110 containing multiple spinners 140 as viewed from a rear of the spinner assembly 40. The cover 142, upper plate 146, and lower plate 150 are shown as translucent components to facilitate discussion related to other components of the spinner subassembly 110. The motor 114 is shown removably attached to the bottom side of the upper plate 146 via fasteners. The drive shaft 160 is shown extending through the upper plate 146 with a trust bearing positioned on the drive shaft 160 between the gear 158 and the top side of the upper plate 146. The gear 162 can be rotationally fixed to a post (not shown) with the post being rotationally attached to the upper plate 146 via a bearing 174. The gear 162 can have a thrust bearing positioned on the post between the gear 162 and the top side of the upper plate 146. The drive shaft 164 (not shown) of each of the spinners 140 can be rotatably mounted to the upper plate 146 via an upper bearing 170 and rotatably mounted to the lower plate 150 via a lower bearing 172. A removable sleeve 141 can be positioned on each spinner 140 between the upper bearing 170 and the lower bearing 172. Each spinner 140 can include a thrust bearing between an upper end of the removable sleeve 141 and the upper plate 146 and include a thrust bearing between a lower end of the removable sleeve 141 and the lower plate 150. These thrust bearings can provide friction reduction between the removable sleeves 141 and the plates 146, 150 that act as retainers and prevent substantial longitudinal movement of the components of each spinner 140 along the respective drive shaft 164 during operation. However, if one or more of the sleeves 141 need to be replaced, then the plate 150 can be released to move away (arrows 126) from the upper plate 146 to facilitate replacement of the removable sleeve 141.

When a sleeve 141 is to be replaced, the fasteners 138 (e.g. bolts) can be unthreaded to allow the lower plate 150 to be moved down (i.e. away from the upper plate 146) a desired distance without removing the fasteners 138 from their threaded connection to the lower plate 148 and possibly the stand-offs 156a, 156b. With the lower plate 150 moved down, then the sleeve 141 of each spinner 140 can be allowed to move longitudinally along the respective drive shaft 164 to provide distance between the upper plate 146 and the spinner sleeve 141, and to provide distance between the lower plate 150 and the spinner sleeve 141. Removal of the sleeves 141 from the spinners will be discussed in greater detail below.

Figure 7:
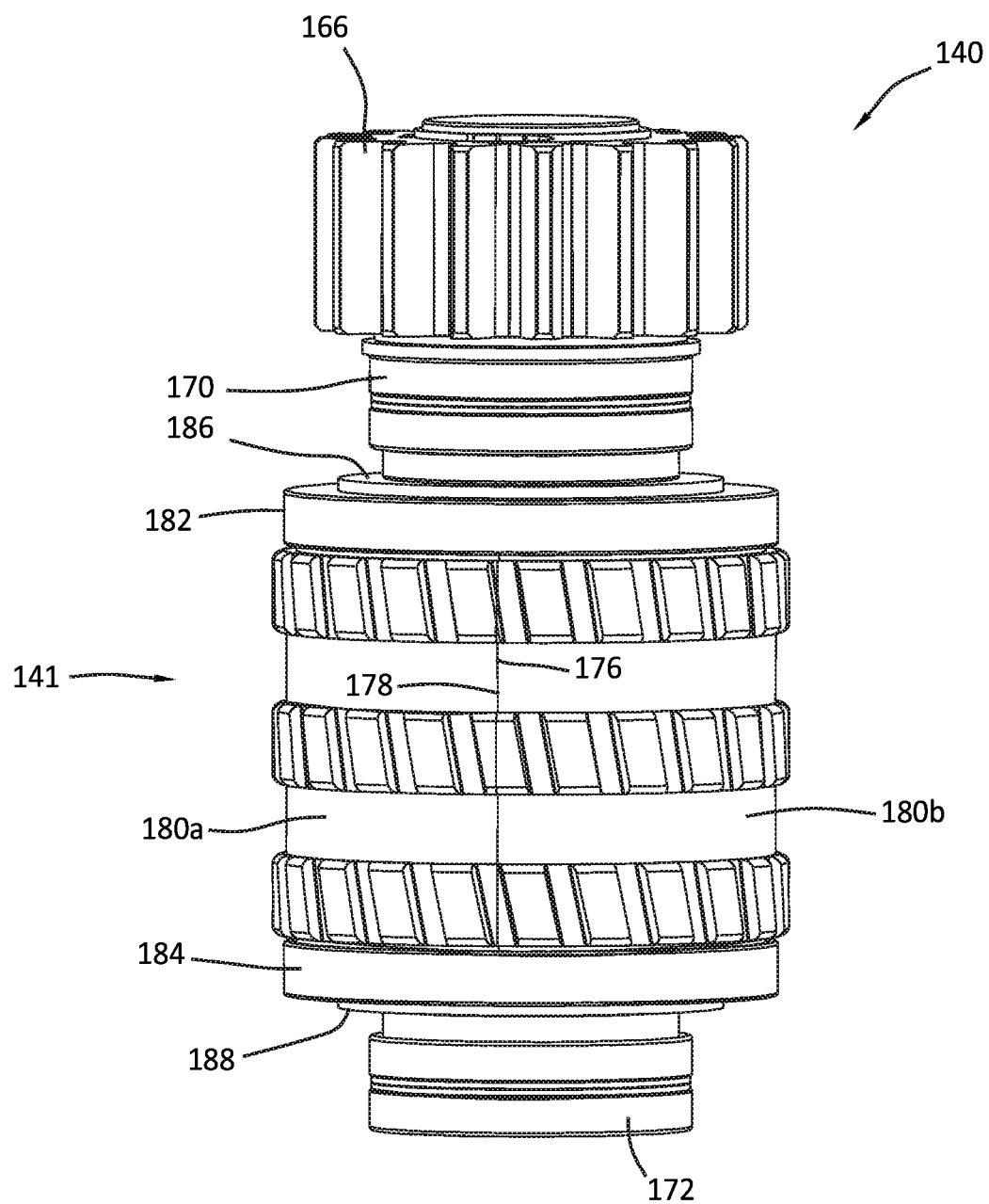
FIG. 7 is a representative perspective view of a spinner, in accordance with certain embodiments.

FIG. 7 is a representative perspective view of a spinner 140, according to certain embodiments. As explained above, the gear 166 can be used to transmit rotational motion to the drive shaft 164 (not shown). The bearings 170, 172 can be used to rotationally attach the drive shaft 164 to the upper and lower plates 146, 150, respectively. The spinner 140 can include a removable sleeve 141 which can include multiple arcuate segments 180a, 180b. The spinner 140 can include additional arcuate segments, but this example includes only two. The spinner 140 can also include a top cap 182 and a bottom cap 184. The thrust bearing 186 can provide reduced friction between the top cap 182 and the upper plate 146. The thrust bearing 188 can provide reduced friction between the bottom cap 184 and the lower plate 150. This configuration shows the arcuate segments 180a, 180b engaged at interface surfaces 176, 178, respectively, with a top portion of the sleeve 141 received by the top cap 182 and a bottom portion of the sleeve 141 received by the bottom cap 184. When the bottom plate 150 is moved away from the upper plate 146 without removing the bottom plate 150 from the subassembly 110, the sleeve can be removed from the top or bottom caps 182, 184 by moving either the sleeve 141, the top cap 182, the bottom cap 184, or combinations thereof along the drive shaft to disengage the sleeve 141 from the caps 182, 184.

Figure 8:
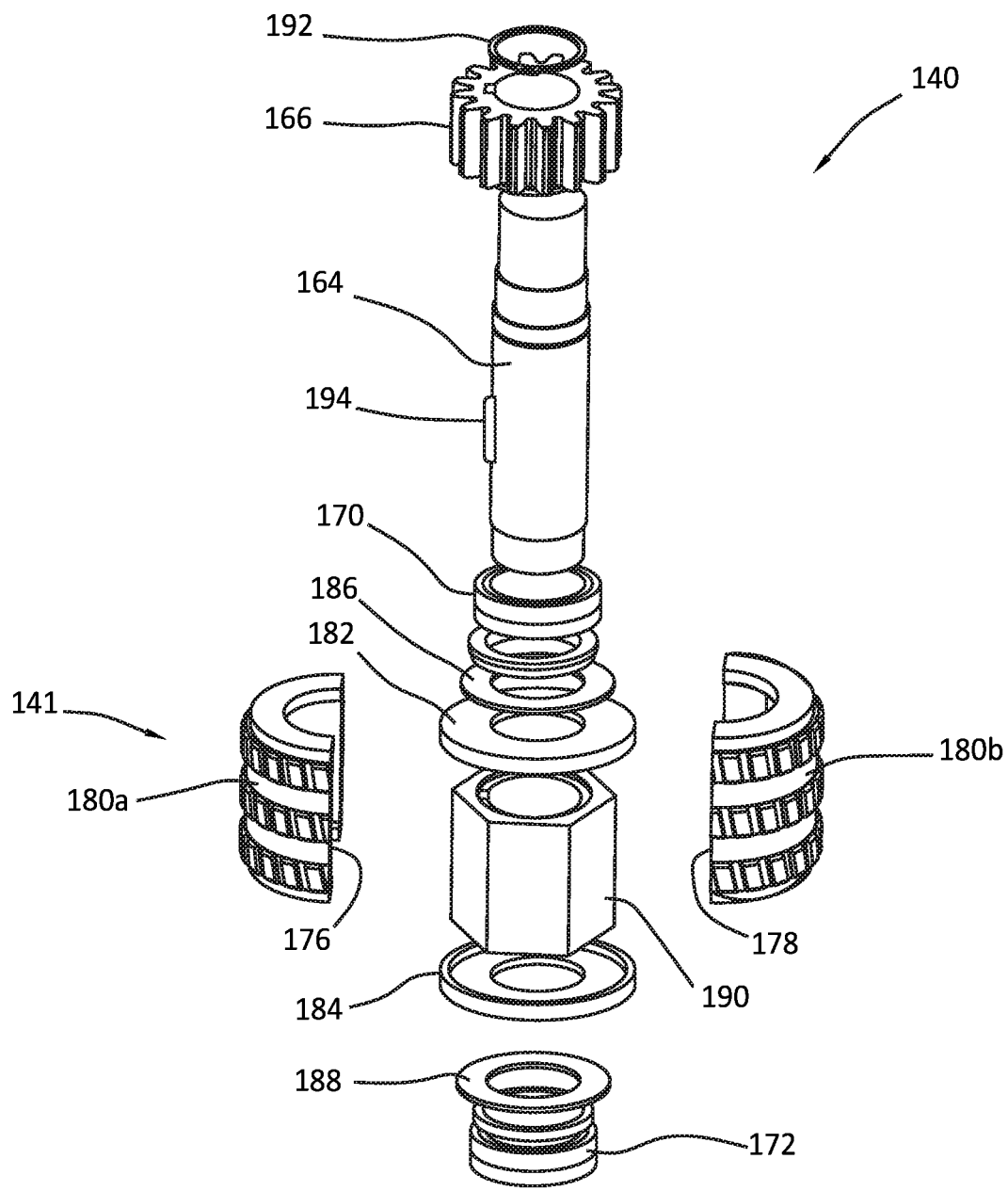
FIG. 8 is a representative perspective exploded view of a spinner, in accordance with certain embodiments.

FIG. 8 is a representative perspective exploded view of a spinner 140. It should be understood that the components shown in FIG. 8 are not exclusive of other components that can also be included in the spinner 140 nor are they all required in the spinner 140. The spinner 140 in FIG. 8 is merely an example embodiment of the spinner 140. For example, there can be more arcuate segments than the two shown (180a, 180b). There can be a drive sleeve 190 with various cross-sectional shapes (e.g. hexagonal, octagonal, oval, square, diamond, star, multiple teeth, etc.). Also, the drive sleeve 190 can be an integral part of the drive shaft 164.

The spinner 140 can include a drive shaft 164 that extends through the spinner 140 from top to bottom. The drive sleeve 190 can be installed on the drive shaft 164 proximate the location of the key 194 such that the key 194 transmits rotational motion from the drive shaft 164 to the drive sleeve 190. The cap 182, thrust bearing 186, and upper bearing 170 can be installed on the drive shaft 164 above the drive sleeve 190, and below the gear 166. The gear 166 can be installed at the top end of the drive shaft 164 with a key used to transmit rotational motion from the gear 166 to the drive shaft 164. A keeper ring 192 can be used to retain the gear 166 on the drive shaft 164. The bottom cap 184, thrust bearing 188, and lower bearing 172 can be installed on the drive shaft 164 below the drive sleeve 190.

The arcuate segments 180a, 180b can be positioned around the drive sleeve 190 to form the sleeve 141, where the sleeve 141 can include an inner surface shaped to mate and engage with the shape of the outer surface of the drive sleeve 190. If the outer surface of the drive sleeve 190 is hexagonally shaped, then the inner surface of the sleeve 141 should have a complimentary recess shaped to mate with the drive sleeve 190. Mating the inner surface of the sleeve 141 with the drive sleeve 190 can act to transmit rotational motion from the drive sleeve 190 to the sleeve 141. When the arcuate segments 180a, 180b are assembled to form the sleeve 141, the interface surfaces 176 of the arcuate segment 180a can abut the interface surfaces 178 of the arcuate segment 180b. Any gap between the interface surfaces 176, 178 should be minimized to reduce movement of the sleeve 14 relative to the drive sleeve 190.

Figure 9A:
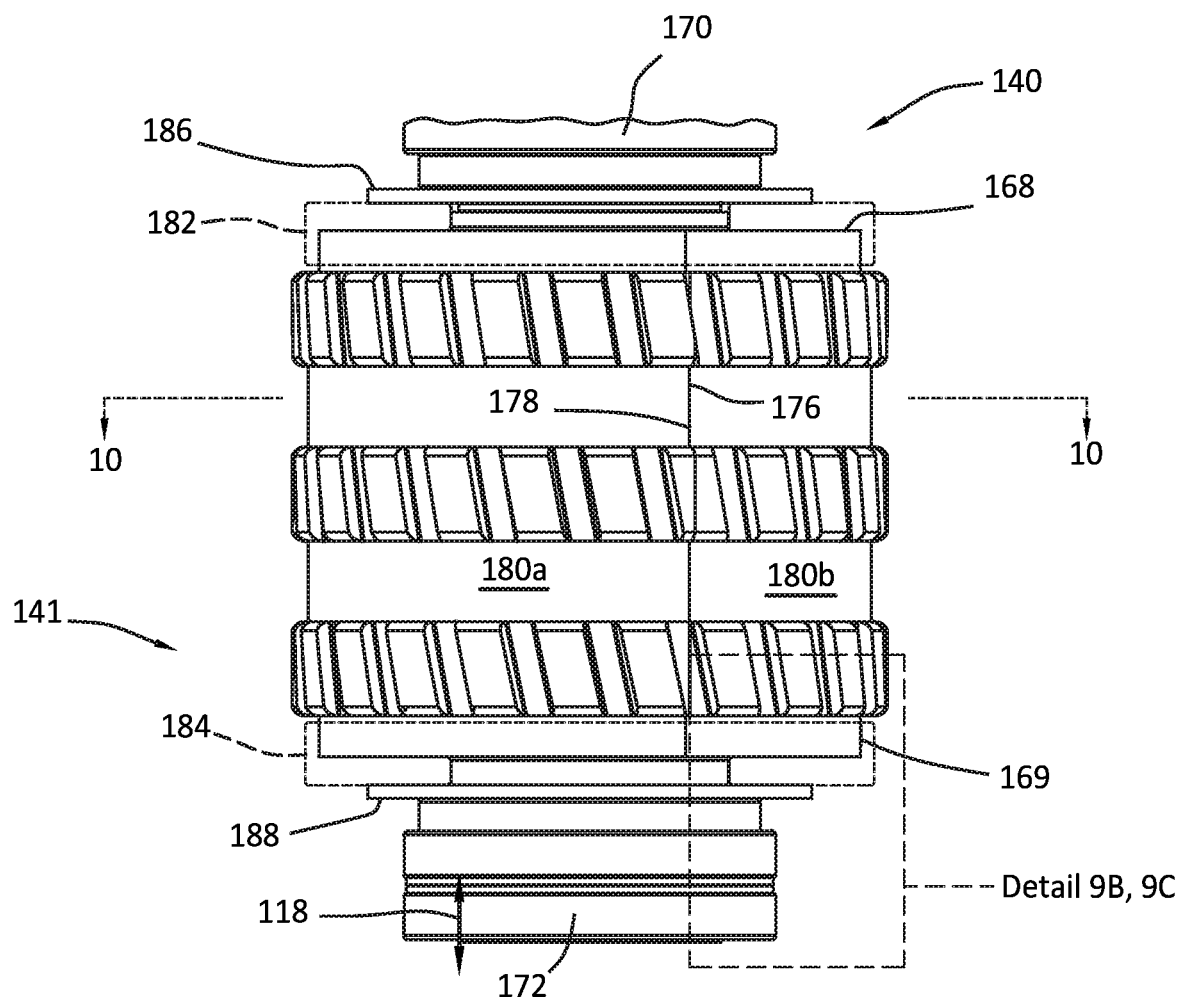
FIG. 9A is a representative front view of a spinner with translucent components for clarity, in accordance with certain embodiments.

FIG. 9A is a representative side view of a spinner 140. The top cap 182 and the bottom cap 184 are shown as translucent components to facilitate discussion related to other components of the spinner 140, in accordance with certain embodiments. The arcuate segments 180a, 180b are installed around the drive shaft 164 (not shown), with the bearings 170, 172, the thrust bearings 186, 188, and the caps 182, 184 are appropriately installed on the drive shaft 164. The top end of the sleeve 141 is received in a recess 168 of the top cap 182. The bottom end of the sleeve 141 is received in a recess 169 of the bottom cap 184. If the bottom bearing 172 is allowed to move down (arrows 118), then sufficient clearance can be provided to remove the bottom end of the sleeve 141 from the recess 169 of the bottom cap 184. Sufficient clearance can also be provided to remove the top end of the sleeve 141 from the recess 168 of the top cap 182. With the sleeve removed from either or both of the caps 182, 184, one or more of the arcuate segments 180a, 180b can be removed and replaced. When the arcuate segments 180a, 180b are again installed around the drive sleeve 190, with the top portion of the sleeve 141 received in the top cap 182 and the bottom portion of the sleeve 141 received in the bottom cap 182, then the lower bearing 172 can be moved up on the drive shaft 164, and the lower plate 150 secured in place to prevent disassembly of the spinner 140.

FIGS. 9B, 9C, 10A-10D are detailed views of the spinner 140 in FIG. 9A to provide a more detailed description of the features of the spinner 140.

FIG. 9B shows the detail view 9B indicated in FIG. 9A. The spinner 140 is in an operational configuration where the spinner 140 can be operated to engage and rotate a tubular 54. The cap 184 is shown as a translucent component for facilitating discussion of the other components. The sleeve 141 can include a radially reduced diameter portion at the top and bottom of the sleeve 141. Only the reduced diameter portion for the bottom end of the sleeve 141 is shown, but the same discussion is similarly applicable to the top end of the sleeve 141. The reduced diameter portion can extend a length L6 from the bottom end of the sleeve 141 (or arcuate segments 180a, 180b). A length L7 indicates a distance from the bottom end of the sleeve 141 to the thrust bearing 188. A length L3 indicates a distance from the top of the reduced portion to the top of the cap 184. The length L4 indicates a distance from the top of the cap 184 to the bottom end of the sleeve 141. L4 can also generally indicate a depth of a recess 169 in the cap 184 into which the sleeve 141 can be received. The length L5 indicates a distance from the bottom end of the sleeve 141 to a bottom of the cap 184. L5 can also generally indicate a thickness of the cap 184 below the recess 169. The length L2 indicates a height of the cap 184. The length L1 indicates a gap between the cap 184 and the thrust bearing 188. The length L8 indicates a radial distance between the reduced diameter portion of the sleeve 141 and the outer surface of the sleeve 141. The length L9 indicates a radial distance from an outer surface of the reduced diameter portion of the sleeve to an outer surface of the cap 184. L9 can also generally indicate a radial thickness of a wall of the cap 184 at the recess 169.

FIG. 9C shows the detail view 9C indicated in FIG. 9A. The lengths L1-L9 are generally the same as described above regarding FIG. 9B, except that the lengths L1 and L7 are increased due to the longitudinal movement (arrows 118) of the thrust bearing 188 and the bearing 172 along the drive shaft 164. The increased gap L1 can allow the bottom cap 184 to be moved downward to remove the lower radially reduced diameter portion of the sleeve 141 from the recess 169 in the bottom cap 184. With the bottom cap 184 moved away from the sleeve 141, the sleeve 141 (i.e. the arcuate segments 180a, 180b) can be removed from the spinner 140 and replaced. To remove the arcuate segments 180a, 180b, the length L1 should be greater than the length L4, which is the height of an overlap of the cap 184 with the lower radially reduced diameter portion of the sleeve 141. This is very similar to the process to remove the upper radially reduced diameter portion of the sleeve 141 from the top cap 182, except that the gap L1 for the top of the spinner (i.e. distance between the thrust bearing 186 and the top cap 182) is increased by moving the sleeve 141 longitudinally down along the drive shaft 164 as required to make the gap L1 greater than the height of the overlap between the upper radially reduced diameter portion of the sleeve 141 and the top cap 182. Various other sequence of operations can be performed to allow the arcuate segments 180a, 180b to be removed and replaced in keeping with the principles of this disclosure. For example, the sleeve 141 can be moved down (arrows 128) the drive shaft 164 to provide clearance above and below the top and bottom caps 182, 184, respectively, then the top and bottom caps can be moved away from the sleeve 141 to allow removal or replacement of the arcuate segments 180a, 180b.

Figure 10B:
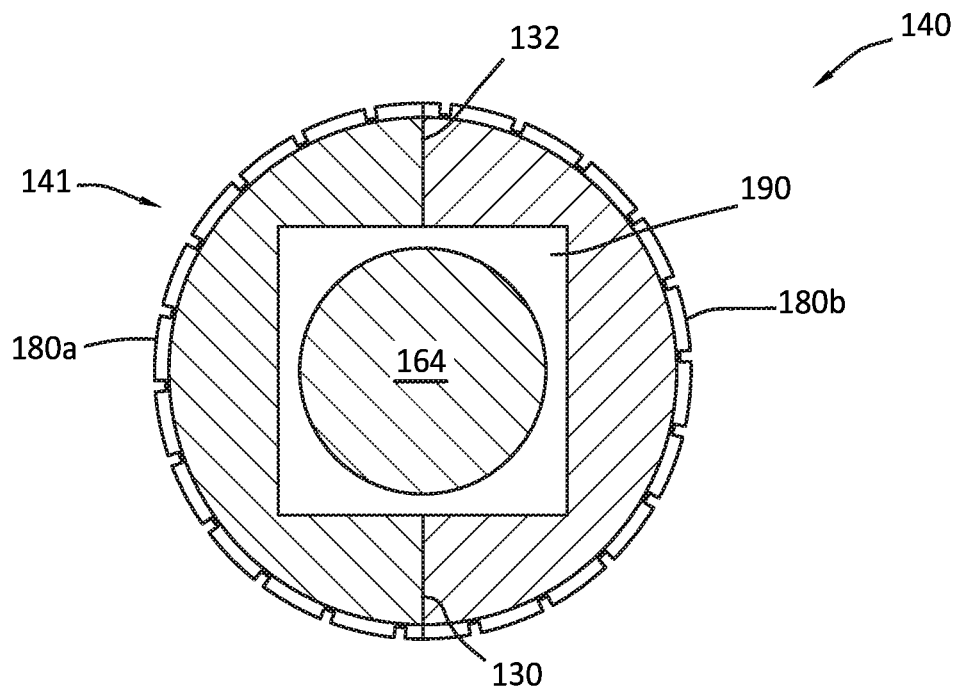
FIGS. 10B-10C are representative partial cross-sectional views of the spinner of FIG. 9A along line 10-10 as indicated in FIG. 9A that show various cross-sections of the drive sleeve, in accordance with certain embodiments.
Figure 10C:
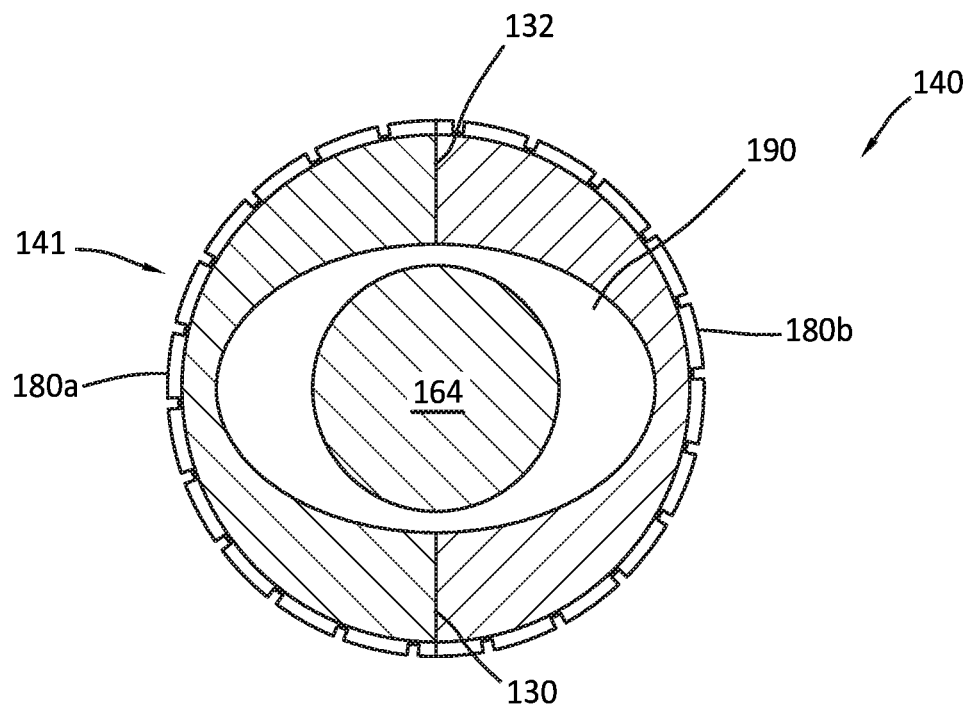

FIG. 10A is a representative partial cross-sectional view of the spinner of FIG. 9A as seen along line 10-10 indicated in FIG. 9A. The spinner 141, in this embodiment, includes two arcuate segments 180a, 180b that have two interface points 130, 132 between the two segments 180a, 180b. At each interface point 130, 132 the surfaces 176, 178 can be abutted when the arcuate segments 180a, 180b are assembled around the drive sleeve 190. Each arcuate segment 180a, 180b extends around the drive shaft 164 by an arc length 211, which in this embodiment can be approximately 180 degrees. The arcuate segments 180a, 180b form the sleeve 141 when they are assembled on the drive shaft 164 and the drive sleeve 190. In this example, the drive sleeve 190 has an outer surface that forms a hexagonally shaped cross-section. Each of the arcuate segments 180a, 180b have inner surfaces 202, 204, respectively, that together form a hexagonally shaped cross-section that can mate to the drive sleeve 190 outer surface. It should be understood that the drive sleeve can be various shapes, as mentioned above with the inner surfaces of the sleeve 141 forming a complimentary shape to mate with the drive sleeve 190. For example, FIG. 10B shows a drive sleeve with a square cross-section for the outer surface, and FIG. 10C that shows a drive sleeve with an oval cross-section for the outer surface. Other cross-sectional shapes are envisioned, as well.

The surface 202 of the arcuate segment 180a can form half of the hexagonally shaped cross-section, with the surface 204 of the arcuate segment 180*b* forming the other half. The outer surfaces 206, 208, of the arcuate segments 180*a*, 180*b*, respectively, form a generally circularly shaped outer surface of the sleeve 141 that can be configured to grip a tubular 54. The drive sleeve 190 can include a through bore that allows the drive shaft 164 to extend through the drive sleeve 190. The drive sleeve 190 can be keyed to the drive shaft 164 to transmit rotational motion from the drive shaft 164 to the drive sleeve 190. The drive shaft 164 can include a key seat 196 in which a key 194 can be installed, with a corresponding key way 198 formed in an inner surface of the drive sleeve 190. The drive shaft 164 can also have other cross-sectional shapes such as square, hexagonal, octagonal, etc. to mate with an inner surface of the drive sleeve 190. With other cross-sectional shapes for the drive shaft 164 at the position of the drive sleeve 190, the key 192 may not be needed to transmit rotational motion from the drive shaft 164 to the drive sleeve 190.

FIG. 10D is a representative partial cross-sectional view of the spinner of FIG. 9A as seen along line 10-10 indicated in FIG. 9A. The spinner 141, in this embodiment, includes three arcuate segments 180*a*, 180*b*, 180*c* that have interface points 130, 132, 134 between adjacent segments 180*a*, 180*b*, 180*c*. At each interface point 130, 132, 134, interface surfaces of the arcuate segments 180*a*, 180*b*, 180*c* can be abutted when they are assembled around the drive sleeve 190. Each arcuate segment 180*a*, 180*b*, 180*c* can extend around the drive shaft 164 by an arc length 211, which in this embodiment can be approximately 120 degrees. It should be understood that more arcuate segments can be included in the sleeve 141, in keeping with the principles of this disclosure.

Figure 11:
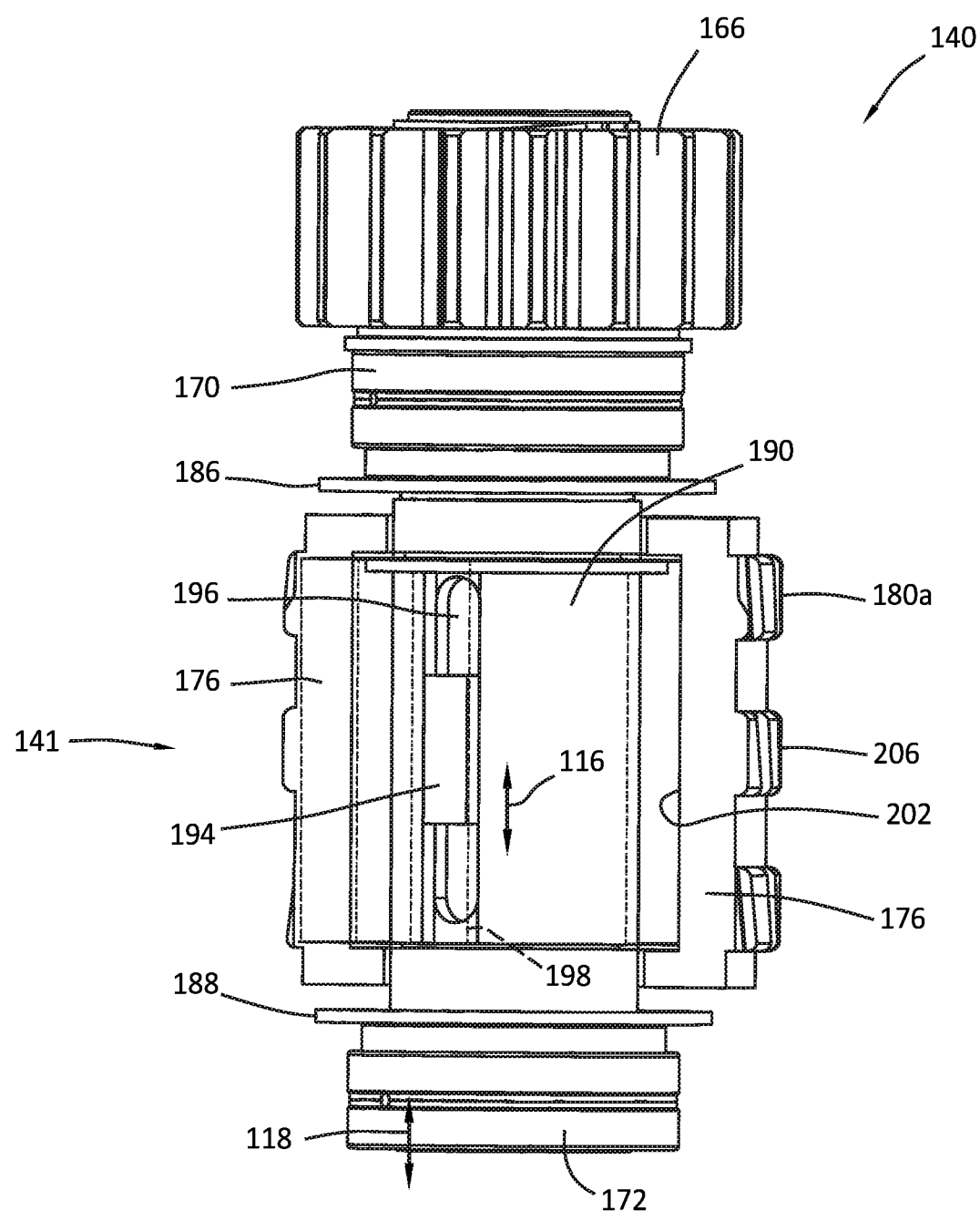
FIG. 11 is a representative perspective view of a spinner with translucent components for clarity, in accordance with certain embodiments.

FIG. 11 is a representative perspective view of another spinner 140. The arcuate segment 180*b* is shown as a translucent component, and the top cap 182 and the bottom cap 184 are shown as transparent components to facilitate discussion related to other components of the spinner 140. Since the other elements have been described above, only the key 194, key seat 196, and key way 198 are discussed in more detail. The key seat 196 is formed in an outer surface of the drive shaft 164. The key seat can be longer than the key 194, as shown in FIG. 11. This can allow the key 194 to move longitudinally along the drive shaft (arrows 116), which can allow the drive sleeve 190 to be moved longitudinally along the drive shaft while restricting rotational motion between the drive shaft 164 and the drive sleeve 190. The key way 198 is formed in an inner surface of the drive sleeve 190 and can extend the length of the drive sleeve 190. This allows the drive sleeve 190 to be slide over the key 194 when the drive sleeve 190 is installed on the drive shaft 164.

Figure 12:
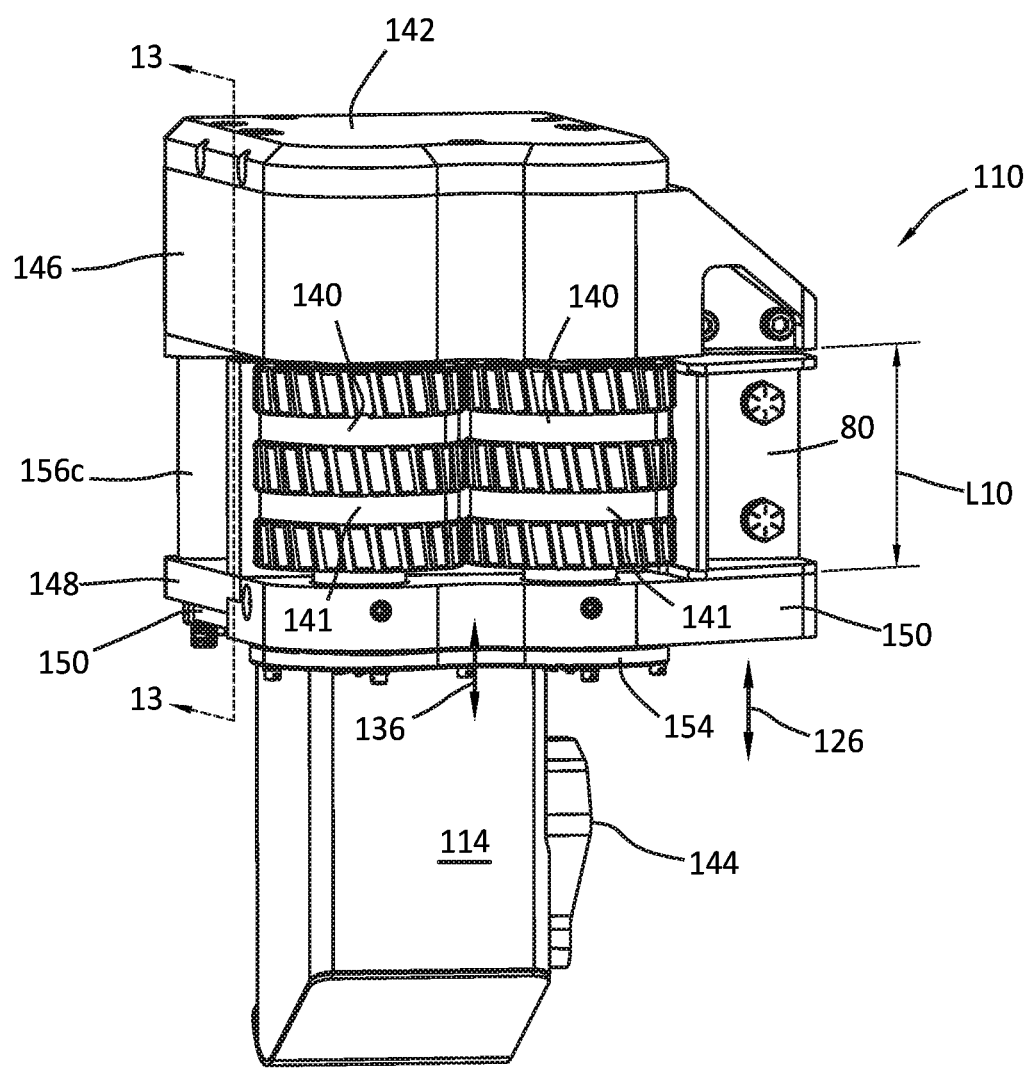
FIG. 12 is a representative perspective view of a spinner subassembly containing multiple spinners, in accordance with certain embodiments.

FIG. 12 is a representative perspective view of another spinner subassembly 110 containing multiple spinners 140 as viewed from the center axis 102. A motor 114 can be mounted parallel to the spinners 140 in the spinner subassembly 110. The motor 114 can include an interface bracket 144 that provides a connection to an energy source (e.g. electrical, hydraulic, pneumatic, etc.) to power and control the motor 114. Two spinners 140 are mounted beside each other and in parallel with the motor 114. The spinners 140 can be rotatably mounted between an upper plate 146 and a lower plate which can be formed by two lower plates 148, 150. The lower plate 148 can be assembled to the upper plate via stand-offs 156*a-d*, with the stand-offs 156*a-d* having a length L10, which is generally the length needed to space the upper plate 146 from the lower plates 148, 150 to hold the spinners between the plates 146 and 148, 150. The lower plate 150 can include an access plate 154 that can be removed to provide access through the lower plate 150 to bearings on the lower end of the spinners 140.

The access plate 154 can be removed (arrows 136) to expose the lower bearings of the spinners 140 and a lower portion of each drive shaft of the spinners 140. By removing the lower portions of the spinners 140, then the lower plate 150 can be removed (arrows 126). When the sleeves 141 of one or more of the spinners are replaced, then the lower plate 150 can be reinstalled (arrows 126), such that the lower plate 150 is again engaged to the lower plate 148 and the spinners 140 are again confined between the upper plate 146 and the lower plate 150. A cover 142 can protect gears used to transmit rotational motion from a drive shaft of the motor 114 to the spinners 140. The spinner subassembly 110 can be coupled to the coupling assembly 60 via the bracket 80.

Figure 13:
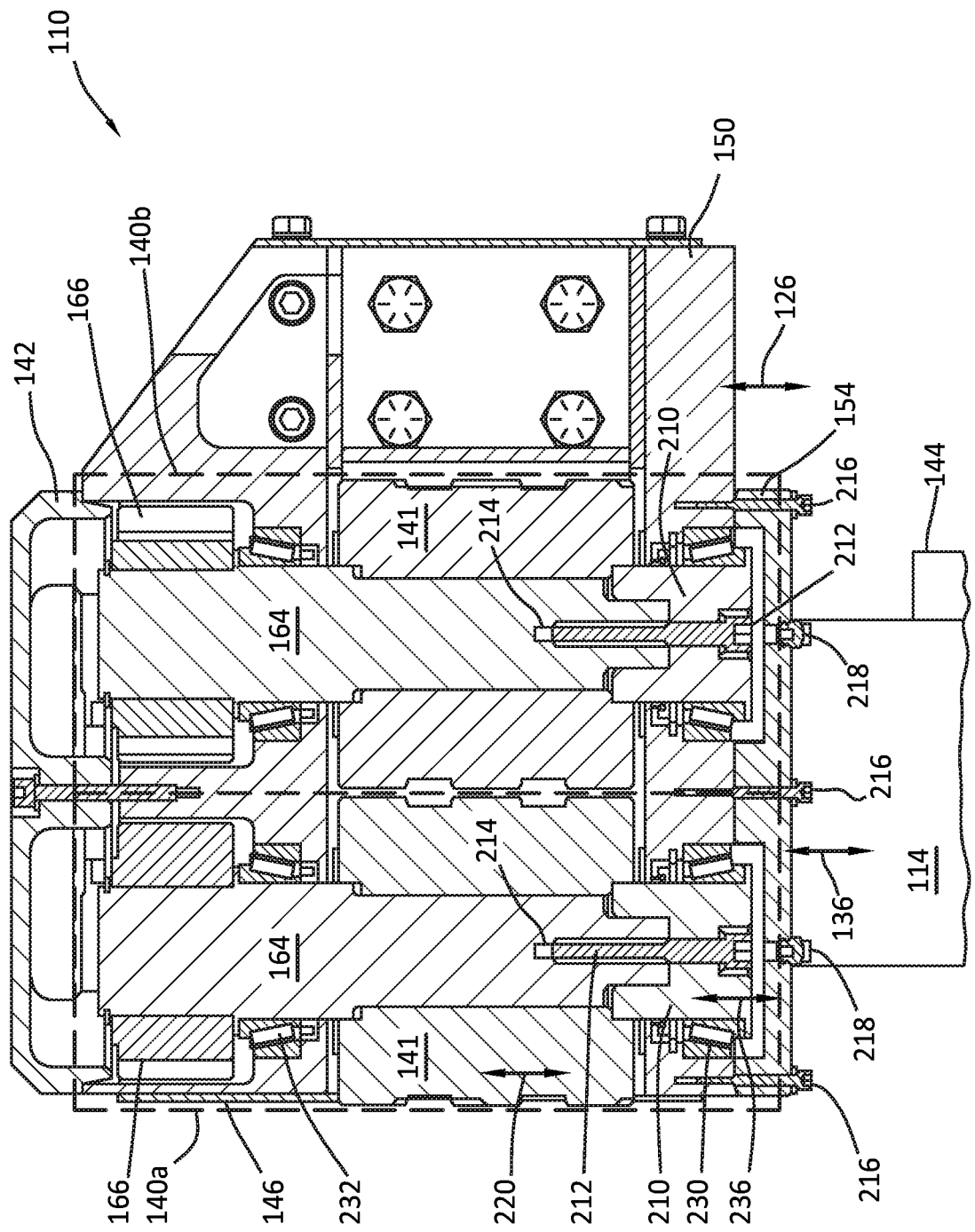
FIG. 13 is a representative partial cross-sectional view of the spinner of FIG. 12 along line 13-13 as indicated in FIG. 12, in accordance with certain embodiments.

FIG. 13 is a representative partial cross-sectional view of the spinner of FIG. 12 as seen along cross-section line 13-13 indicated in FIG. 12. This embodiment of the spinner subassembly 110 (and similarly, spinner subassembly 120) is different from the other disclosed embodiments of the spinner subassemblies in at least that the drive shaft 164 of each spinner 140*a*, 140*b* can include a drive end 210 that can be removed from the drive shaft 164 to allow replacement of the sleeves 141 of the spinners 140*a*, 140*b*, without further disassembly of the spinner subassembly 110 (or 120). In the following description, discussion related to the elements of the spinner 140*a* is equally applicable to the elements of the spinner 140*b*.

Similarly, as described above regarding drive means for the spinners 140, the drive gears 166 of the spinners 140*a*, 140*b* are coupled to a drive gear of the motor 114, with the gears being disposed under the cover 142. The drive gear 16 can be rotationally fixed to the drive shaft 164, with the drive shaft being rotationally coupled to the upper plate 146 via the upper bearing 232. The upper bearing 232 can have an inclined bearing race that may require a desired compression force to operate at peak efficiency. A sleeve 141 can be slipped over the drive shaft 164 (arrows 220) and rotationally fixed to the drive shaft 164 via a key/keyway interface or any other configurations as described in the proceeding description for rotationally fixing the drive shaft 164 to the sleeve 141.

When the sleeve 141 is inserted over the drive shaft 164, the lower plate 150 can be attached, as described above, to lower plate 148 to capture the sleeves 141 between the upper plate 146 and the lower plate 150. The drive end 210 can then be attached to the end of the drive shaft 164 (arrows 236) via the fastener 212 being threaded into the threaded bore 214. When attached, the drive end 210 can be rotationally fixed to the drive shaft 164, via splines, key/keyway interface, any other configurations as described in the proceeding description for rotationally fixing two rotationally members together, similar to rotationally fixing the drive shaft 164 to the sleeve 141. A lower bearing 230 can be disposed between the drive end 210 and the bottom plate 150 to thereby rotationally couple the drive end 210 to the bottom plate 150. The lower bearing 232 can have an inclined bearing race that may require a desired compression force to operate at peak efficiency. The compression force applied to the bearings 230, 232 can be adjusted by threading the fastener 212 in or out of the threaded bore 214. By threading the fastener 212 into the threaded bore 214, the compression force applied to the bearings 230, 232 can be increased. By threading the fastener 212 out of the threaded bore 214, the compression force applied to the bearings 230, 232 can be decreased. Adjusting the compression force can produce the desired compression force for the bearings 230, 232.

A access plate 154 can be attached (arrows 136) to the lower plate 150 via fasteners 216, to cover the end of the drive ends 210 and the bearings 230. The access plug 218 can be selectively removed while the spinner subassembly 110 is assembled to allow for adjusting compression on the bearings 230, 232.

If one or more of the spinner sleeves 141 needs to be removed and replaced, then this configuration of the spinner subassembly 110 (and similarly 120) allows for minimal disassembly of the spinner subassembly 110 to facilitate replacement of the one or more sleeves 141. For example, to replace a sleeve 141 of the spinner subassembly 110, the lower plate 150 can be removed by removing fasteners 216. The fasteners 212 can then be unthreaded from the threaded bores 214 of the drive shafts 164, allowing removal of the drive ends 210 from the ends of the drive shafts 164. It may be preferable for the bearings 230 to remain attached to the lower plate 150 with the drive ends 210 being extracted from the bearings 230, but the bearings 230 are not required to remain attached to the lower plate 150. The bearings 230 can remain attached to the drive ends 210 or be removed from both the drive ends 210 and the lower plate 150.

With the drive ends 210 are removed, then the lower plate 150 can be detached from the lower plate 148, that allows the lower plate 150 to be removed from the spinner subassembly 110. Removal of the lower plate 150 allows sufficient clearance for one or more of the sleeves 141 to be removed from the respective drive shaft 164 and replaced by sliding a new sleeve 141 onto the drive shaft 164. The process described above for removing the sleeve 141 can then be performed in reverse to reassemble the spinner subassembly 110. Therefore, a sleeve 141 can be replaced without disassembling any other parts of the spinner assembly 40.

VARIOUS EMBODIMENTS

Embodiment 1

A system for conducting subterranean operations, the system comprising:

a spinner assembly comprising a plurality of spinners, with each spinner comprising:

a drive shaft that extends longitudinally through the spinner;

a sleeve that surrounds the drive shaft, with the sleeve comprising arcuate segments; and a first cap that is configured to receive a first end of the sleeve.

Embodiment 2

The system of embodiment 1, further comprising a second cap that is configured to receive a second end of the sleeve.

Embodiment 3

The system of embodiment 2, wherein the first cap comprises a first recess that receives the first end of the sleeve and secures the arcuate segments of the sleeve on the drive shaft.

Embodiment 4

The system of embodiment 3, wherein the second cap comprises a second recess that receives the second end of the sleeve and secures the arcuate segments of the sleeve on the drive shaft.

Embodiment 5

The system of embodiment 2, wherein the arcuate segments are configured to be removed from the spinner when the first end is removed from the first cap.

Embodiment 6

The system of embodiment 2, wherein the arcuate segments are configured to be removed from the spinner when the second end is removed from the second cap.

Embodiment 7

The system of embodiment 2, the arcuate segments are configured to be removed from the spinner when the first end is removed from the first cap and the second end is removed from the second cap.

Embodiment 8

The system of embodiment 2, wherein the spinner assembly comprises a first subassembly and a second subassembly, with the first subassembly comprising a first spinner and a second spinner and the second subassembly comprising a third spinner and a fourth spinner.

Embodiment 9

The system of embodiment 8, further comprising a coupling assembly that couples the first subassembly to the second subassembly.

Embodiment 10

The system of embodiment 9, wherein the coupling assembly simultaneously moves the first subassembly and the second subassembly relative to a center axis of the spinner assembly.

Embodiment 11

The system of embodiment 10, wherein the coupling assembly moves the first subassembly a first distance away from the center axis and simultaneously moves the second subassembly a second distance away from the center axis.

Embodiment 12

The system of embodiment 11, wherein first distance is substantially equal to the second distance, and wherein the coupling assembly moves the first subassembly in a first direction away from the center axis and moves the second subassembly in a second direction away from the center axis, with the first direction being opposite the second direction.

Embodiment 13

The system of embodiment 10, wherein the coupling assembly moves the first subassembly a first distance toward the center axis and simultaneously moves the second subassembly a second distance toward the center axis.

Embodiment 14

The system of embodiment 13, wherein first distance is substantially equal to the second distance, and wherein the coupling assembly moves the first subassembly in a first direction toward the center axis and moves the second subassembly in a second direction toward the center axis, with the first direction being opposite the second direction.

Embodiment 15

The system of embodiment 10, wherein the coupling assembly comprises an actuator that simultaneously moves the first subassembly and the second subassembly relative to the center axis.

Embodiment 16

The system of embodiment 15, wherein extension of the actuator moves the first subassembly and the second subassembly away from the center axis a substantially equal distance and in opposite directions.

Embodiment 17

The system of embodiment 16, wherein retraction of the actuator moves the first subassembly and the second subassembly toward the center axis a substantially equal distance and in opposite directions.

Embodiment 18

The system of embodiment 15, wherein the coupling assembly further comprises a first link and a second link, with a first end of the first link rotationally attached a guide pin and a first end of the second link rotationally attached the guide pin, wherein a second end of the first link is rotationally attached to a first end of the actuator and a second end of the second link is rotationally attached to a second end of the actuator.

Embodiment 19

The system of embodiment 18, wherein the coupling assembly further comprises a guide channel, wherein the guide pin is configured to move along the guide channel, and wherein the guide channel is perpendicular to a direction of travel of the actuator.

Embodiment 20

The system of embodiment 19, wherein the guide channel is fixed relative to the center axis, wherein the first link and the second link are substantially equal in length.

Embodiment 21

The system of embodiment 20, wherein extension or retraction of the actuator along the direction of travel of the actuator moves the first end of the actuator and the second end of the actuator in opposite directions by a substantially equal distance in response to the guide links coupled to the guide channel by the guide pin.

Embodiment 22

The system of embodiment 2, wherein the drive shaft comprises a drive sleeve with an outer surface having a polygonal shape that engages a complimentary shaped inner surface of the sleeve, and wherein the drive shaft is rotationally fixed to the drive sleeve.

Embodiment 23

The system of embodiment 22, wherein the drive shaft is rotationally fixed to the drive sleeve.

Embodiment 24

The system of embodiment 23, wherein the drive sleeve engages the sleeve and is rotationally fixed to the drive sleeve when the sleeve is installed in the spinner.

Embodiment 25

A system for conducting subterranean operations, the system comprising:
a spinner assembly comprising first and second subassemblies disposed on opposites sides of a center axis of the spinner assembly, with each of the first and second subassemblies comprising a plurality of spinners;
an actuator; and
a coupling assembly that couples that actuator to the first and second subassemblies, such that movement of the actuator by a first distance moves that first subassembly a second distance relative to the center axis and moves the second subassembly a third distance relative to the center axis, with the second distance being substantially equal to the third distance and in an opposite direction relative to the third distance.

Embodiment 26

The system of embodiment 25, wherein each spinner comprises:
a drive shaft that extends longitudinally through the spinner;
a sleeve that surrounds the drive shaft, with the sleeve comprising arcuate segments;
a first cap that receives a first end of the sleeve; and
a second cap that receives a second end of the sleeve.

Embodiment 27

The system of embodiment 26, wherein the sleeve comprises two or three arcuate segments.

Embodiment 28

The system of embodiment 25, wherein the first subassembly moves in a first direction and the second subassembly moves in a second direction, with the first direction and the second direction being opposite each other and being parallel to a direction of the movement of the actuator.

Embodiment 29

The system of embodiment 28, wherein the actuator simultaneously moves the first subassembly and the second subassembly relative to the center axis of the spinner assembly.

Embodiment 30

The system of embodiment 25, wherein the coupling assembly further comprises a first link and a second link, with a first end of the first link rotationally attached a guide pin and a first end of the second link rotationally attached the guide pin, wherein a second end of the first link is rotationally attached to a first end of the actuator and a second end of the second link is rotationally attached to a second end of the actuator.

Embodiment 31

The system of embodiment 30, wherein the coupling assembly further comprises a guide channel, wherein the guide pin is configured to move along the guide channel, and wherein the guide channel is perpendicular to a direction of travel of the actuator.

Embodiment 32

The system of embodiment 31, wherein the guide channel is fixed relative to the center axis, wherein the first link and the second link are substantially equal in length.

Embodiment 33

The system of embodiment 32, wherein extension or retraction of the actuator along the direction of travel of the actuator moves the first end of the actuator and the second end of the actuator in opposite directions by a substantially equal distance in response to the first link and the second link coupled to the guide channel by the guide pin.

Embodiment 34

A method for conducting subterranean operations, the method comprising:
securing a plurality of arcuate segments of a sleeve to a drive shaft of a spinner in a spinner assembly, by inserting a first end of the sleeve into a first recess of a first cap, thereby securing the plurality of arcuate segments to the drive shaft.

Embodiment 35

The method of embodiment 34, further comprising inserting a second end of the sleeve into a second recess of a second cap, thereby securing the plurality of arcuate segments to the drive shaft.

Embodiment 36

The method of embodiment 35, further comprising:
removing the first end of the sleeve from the first recess; and
removing at least one of the plurality of arcuate segments from the spinner.

Embodiment 37

The method of embodiment 36, further comprising:
installing one or more new arcuate segments into the sleeve, thereby replacing the at least one of the plurality of arcuate segments; and
securing the sleeve, comprising the one or more new arcuate segments, to the drive shaft by inserting the first end of the sleeve into the first recess.

Embodiment 38

The method of embodiment 35, further comprising:
removing the second end of the sleeve from the second recess; and
removing at least one of the plurality of arcuate segments from the spinner.

Embodiment 39

The method of embodiment 38, further comprising:
installing one or more new arcuate segments into the sleeve, thereby replacing the at least one of the plurality of arcuate segments; and
securing the sleeve, comprising the one or more new arcuate segments, to the drive shaft by inserting the second end of the sleeve into the second recess.

Embodiment 40

The method of embodiment 35, further comprising:
removing the first end of the sleeve from the first recess;
removing the second end of the sleeve from the second recess; and
removing at least one of the plurality of arcuate segments from the spinner.

Embodiment 41

The method of embodiment 40, further comprising:
installing one or more new arcuate segments into the sleeve, thereby replacing the at least one of the plurality of arcuate segments; and
securing the sleeve, comprising the one or more new arcuate segments, to the drive shaft by inserting the first end of the sleeve into the first recess and inserting the second end of the sleeve into the second recess.

Embodiment 42

The method of embodiment 35, further comprising:
disposing the sleeve on the drive shaft between the first cap and the second cap; and
disposing the first cap, the second cap, and the sleeve on the drive shaft between first and second plates of the spinner assembly, with the first and second plates preventing removal of the sleeve from either the first cap or the second cap.

Embodiment 43

The method of embodiment 42, further comprising:
moving the second plate relative to the first plate to increase a gap between the second cap and the second plate; and
moving the second cap along the drive shaft into the gap, thereby removing the second end of the sleeve from the second cap.

Embodiment 44

The method of embodiment 43, further comprising:

removing at least one of the plurality of arcuate segments from the spinner.

Embodiment 45

The method of embodiment 43, further comprising:

moving the sleeve along the drive shaft toward the second plate;

moving the first cap along the drive shaft toward the first plate, thereby removing the first end of the sleeve from the first cap; and removing at least one of the plurality of arcuate segments from the spinner.

Embodiment 46

The method of embodiment 45, further comprising:

installing one or more new arcuate segments into the sleeve, thereby replacing the at least one of the plurality of arcuate segments; and securing the sleeve, comprising the one or more new arcuate segments, to the drive shaft by inserting the first end of the sleeve into the first recess and inserting the second end of the sleeve into the second recess.

Embodiment 47

The method of embodiment 46, further comprising:

preventing removal of the one or more new arcuate segments by moving the second plate relative to the first plate to decrease a distance between the first plate and the second plate, thereby preventing removal of the first end from the first cap or removal of the second end from the second cap.

Embodiment 48

A system for conducting subterranean operations, the system comprising:

a spinner assembly comprising a plurality of spinners, with each spinner comprising:

a sleeve with a plurality of arcuate segments, wherein each one of the plurality of arcuate segments forms a portion of a first radially reduced portion of the sleeve at a first end of the sleeve; and a first cap that is configured to receive the first radially reduced portion and restrict radial movement of the plurality of arcuate segments away from each other.

Embodiment 49

The system of embodiment 48, wherein each one of the plurality of arcuate segments forms a portion of a second radially reduced portion of the sleeve at a second end of the sleeve, the system further comprising a second cap that is configured to receive the second radially reduced portion and restrict radial movement of the plurality of arcuate segments away from each other.

Embodiment 50

The system of embodiment 49, further comprising any one of embodiments 3 to 24.

Embodiment 51

A system for conducting subterranean operations, the system comprising:

a spinner assembly comprising a plurality of spinners, with each spinner comprising:

a sleeve with a plurality of arcuate segments, wherein each one of the plurality of arcuate segments forms a portion of a first radially reduced portion of the sleeve at a first end of the sleeve, a first cap that is configured to receive the first radially reduced portion, and a thrust bearing;

a top plate, with the thrust bearing positioned between the first cap and the top plate; and a bottom plate positioned parallel with the top plate and spaced away from the top plate by a first length, with the plurality of spinners rotationally coupled to the top plate and the bottom plate, and the plurality of spinners being disposed between the top plate and the bottom plate, wherein the first length confines the plurality of arcuate segments axially.

Embodiment 52

The system of embodiment 51, further comprising any one of embodiments 3 to 24.

Embodiment 53

A system for conducting subterranean operations, the system comprising:

a spinner assembly comprising:

a plurality of spinners, with each spinner comprising:

a sleeve with a plurality of arcuate segments, and a first cap configured to receive a first end of the sleeve;

a top plate; and a bottom plate positioned parallel to the top plate and selectively spaced away from the top plate a first length or a second length, wherein the first length axially confines the first caps on the respective first ends when the respective first ends of the sleeves are received by the respective first caps, and wherein the first length radially confines a respective plurality of arcuate segments to the respective spinner.

Embodiment 54

The system of embodiment 53, wherein the second length allows removal of the first ends of the sleeves from the respective first caps and removal of the respective plurality of arcuate segments from the respective spinner.

Embodiment 55

The system of embodiment 54, further comprising any one of embodiments 3 to 24.

Embodiment 56

A system for conducting subterranean operations, the system comprising:

a spinner assembly comprising a plurality of spinners, with each spinner comprising:

a drive shaft that extends longitudinally through the spinner;

a sleeve that surrounds the drive shaft, with the sleeve comprising arcuate segments; and a first cap that is configured to receive a first end of the sleeve.

Embodiment 57

The system of embodiment 56, further comprising a second cap that is configured to receive a second end of the sleeve.

Embodiment 58

The system of embodiment 57, wherein the first cap comprises a first recess that receives the first end of the sleeve and secures the arcuate segments of the sleeve on the drive shaft.

Embodiment 59

The system of embodiment 58, wherein the second cap comprises a second recess that receives the second end of the sleeve and secures the arcuate segments of the sleeve on the drive shaft.

Embodiment 60

The system of embodiment 59, wherein the arcuate segments are configured to be removed from the spinner when the first end is removed from the first recess.

Embodiment 61

The system of embodiment 59, wherein the arcuate segments are configured to be removed from the spinner when the second end is removed from the second recess.

Embodiment 62

The system of embodiment 59, the arcuate segments are configured to be removed from the spinner when the first end is removed from the first recess and the second end is removed from the second recess.

Embodiment 63

The system of embodiment 57, wherein the spinner assembly comprises a first subassembly and a second subassembly, with the first subassembly comprising a first spinner and a second spinner and the second subassembly comprising a third spinner and a fourth spinner.

Embodiment 64

The system of embodiment 63, further comprising a coupling assembly that couples the first subassembly to the second subassembly, wherein the coupling assembly simultaneously moves the first subassembly and the second subassembly relative to a center axis of the spinner assembly.

Embodiment 65

The system of embodiment 64, wherein the coupling assembly moves the first subassembly a first distance relative to the center axis and simultaneously moves the second subassembly a second distance relative to the center axis.

Embodiment 66

A method for conducting subterranean operations, the method comprising:
securing a plurality of arcuate segments of a sleeve to a drive shaft of a spinner in a spinner assembly, by inserting a first end of the sleeve into a first recess of a first cap, thereby securing the plurality of arcuate segments to the drive shaft.

Embodiment 67

The method of embodiment 66, further comprising inserting a second end of the sleeve into a second recess of a second cap, thereby securing the plurality of arcuate segments to the drive shaft.

Embodiment 68

The method of embodiment 67, further comprising:
removing the first end of the sleeve from the first recess;
removing the second end of the sleeve from the second recess; and
removing at least one of the plurality of arcuate segments from the spinner.

Embodiment 69

The method of embodiment 68, further comprising:
installing one or more new arcuate segments into the sleeve, thereby replacing the at least one of the plurality of arcuate segments; and
securing the sleeve, comprising the one or more new arcuate segments, to the drive shaft by inserting the first end of the sleeve into the first recess and inserting the second end of the sleeve into the second recess.

Embodiment 70

A system for conducting subterranean operations, the system comprising:
a spinner assembly comprising a plurality of spinners, with each spinner comprising:
  a drive shaft that extends longitudinally through the spinner, the drive shaft comprising an upper portion and a lower portion; and
  a sleeve that surrounds the drive shaft, the sleeve being configured to be removed from the spinner assembly when the lower portion of the drive shaft is disconnected from the upper portion of the drive shaft.

Embodiment 71

The system of embodiment 70, further comprising a spinner subassembly, wherein the upper portion of the drive shaft is rotationally coupled to an upper plate of the spinner subassembly via a first bearing, wherein the lower portion of the drive shaft is rotationally coupled to a lower plate of the spinner subassembly via a second bearing, and wherein a fastener that attaches the lower portion to the upper portion is configured to increase or decrease a compression on the first bearing and the second bearing.

Embodiment 72

The system of embodiment 71, wherein the lower plate prevents removal of the sleeve from the drive shaft when the lower plate is assembled in the spinner subassembly, and wherein the lower plate allows removal of the sleeve from the drive shaft when the lower plate is removed from the spinner subassembly.

Embodiment 73

The system of embodiment 70, wherein the spinner assembly comprises a first subassembly and a second subassembly, with the first subassembly comprising a first spinner and a second spinner and the second subassembly comprising a third spinner and a fourth spinner.

Embodiment 74

The system of embodiment 73, further comprising a coupling assembly that couples the first subassembly to the second subassembly, wherein the coupling assembly simultaneously moves the first subassembly and the second subassembly relative to a center axis of the spinner assembly.

Embodiment 75

The system of embodiment 74, wherein the coupling assembly moves the first subassembly a first distance relative to the center axis and simultaneously moves the second subassembly a second distance relative to the center axis.

Embodiment 76

A method for conducting subterranean operations, the method comprising:
removing a sleeve of a spinner from a drive shaft of the spinner, with the spinner being one of a plurality of spinners in a spinner subassembly, by disconnecting a lower portion of the drive shaft from an upper portion of the drive shaft and removing the lower portion from the spinner subassembly.

Embodiment 77

The method of embodiment 76, wherein the subassembly further comprises an upper plate and a lower plate, with the sleeve disposed between the upper plate and the lower plate, and wherein the drive shaft extends into the upper plate and extends into the lower plate, when the upper portion of the drive shaft is attached to the lower portion of the drive shaft.

Embodiment 78

The method of embodiment 77, further comprising removing the sleeve from the drive shaft further comprises removing the lower plate from the spinner subassembly.

Embodiment 79

The method of embodiment 78, further comprising replacing the sleeve with a new sleeve by:
inserting the new sleeve over the upper portion of the drive shaft;
reinstalling the lower plate into the spinner subassembly, thereby constraining the new sleeve on the upper portion;
aligning the lower portion of the drive shaft to the upper portion of the drive shaft through the lower plate; and
securing the lower portion of the drive shaft to the upper portion of the drive shaft by inserting a fastener through the lower portion and threading the fastener into the upper portion.

Embodiment 80

The method of embodiment 79, adjusting a compression applied to bearings that rotationally couple the drive shaft to the spinner subassembly by tightening or loosening the fastener.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

The invention claimed is:

1. A system for conducting subterranean operations, the system comprising:
a spinner assembly comprising a plurality of spinners, wherein each spinner is rotationally coupled to an upper plate of the spinner assembly and rotationally coupled to a lower plate of the spinner assembly, wherein each spinner is disposed between the upper plate and the lower plate, and wherein each spinner comprises:
a drive shaft that extends longitudinally through the spinner;
a sleeve that surrounds the drive shaft, with the sleeve comprising arcuate segments; and
a first cap that is configured to receive a first end of the sleeve into a first recess in the first cap, wherein the first end of the sleeve, when installed in the spinner assembly, has a first outer diameter, wherein the first recess has a first inner diameter that is larger than the first outer diameter of the first end, and wherein the first end is received in the first recess such that the first end protrudes into the first recess when the sleeve is installed in the spinner assembly.

2. The system of claim 1, further comprising a second cap that is configured to receive a second end of the sleeve into a second recess in the second cap, wherein the second end of the sleeve, when installed in the spinner assembly, has a second outer diameter, wherein the second recess has a second inner diameter that is larger than the second outer diameter of the second end, and wherein the second end is received in the second recess such that the second end protrudes into the second recess when the sleeve is installed in the spinner assembly.

3. The system of claim 2, wherein the first recess receives the first end of the sleeve and secures the arcuate segments of the sleeve on the drive shaft.

4. The system of claim 3, wherein the second recess receives the second end of the sleeve and secures the arcuate segments of the sleeve on the drive shaft.

5. The system of claim 4, wherein the arcuate segments are configured to be removed from the spinner when the first end is removed from the first recess.

6. The system of claim 4, wherein the arcuate segments are configured to be removed from the spinner when the second end is removed from the second recess.

7. The system of claim 4, the arcuate segments are configured to be removed from the spinner when the first end is removed from the first recess and the second end is removed from the second recess.

8. The system of claim 2, wherein the spinner assembly comprises a first subassembly and a second subassembly, with the first subassembly comprising a first spinner and a second spinner and the second subassembly comprising a third spinner and a fourth spinner.

9. The system of claim 8, further comprising a coupling assembly that couples the first subassembly to the second subassembly, wherein the coupling assembly simultaneously moves the first subassembly and the second subassembly relative to a center axis of the spinner assembly.

10. The system of claim 9, wherein the coupling assembly moves the first subassembly a first distance relative to the center axis and simultaneously moves the second subassembly a second distance relative to the center axis.

11. A method for conducting subterranean operations, the method comprising:
positioning a spinner of a spinner assembly between an upper plate of the spinner assembly and a lower plate of the spinner assembly;
inserting a first end of a sleeve into a first recess of a first cap by axially moving the first cap relative to a drive shaft to insert the first end into the first recess of the first cap such that the first end protrudes into the first recess, wherein the first end has a first outer diameter when the sleeve is installed in the spinner assembly, and wherein the first recess has a first inner diameter that is larger than the first outer diameter; and
thereby securing a plurality of arcuate segments of the sleeve to the drive shaft of the spinner.

12. The method of claim 11, further comprising inserting a second end of the sleeve into a second recess of a second cap by axially moving the second cap relative to the drive shaft to insert the second end into the second recess of the second cap such that the second end protrudes into the second recess, wherein the second end has a second outer diameter when the sleeve is installed in the spinner assembly, and wherein the second recess has a second inner diameter that is larger than the second outer diameter; and
thereby securing the plurality of arcuate segments to the drive shaft.

13. The method of claim 12, further comprising:
removing the first end of the sleeve from the first recess;
removing the second end of the sleeve from the second recess; and
removing at least one of the plurality of arcuate segments from the spinner.

14. The method of claim 13, further comprising:
installing one or more new arcuate segments into the sleeve, thereby replacing the at least one of the plurality of arcuate segments; and
securing the sleeve, comprising the one or more new arcuate segments, to the drive shaft by inserting the first end of the sleeve into the first recess and inserting the second end of the sleeve into the second recess.

15. A system for conducting subterranean operations, the system comprising:
a spinner assembly comprising a plurality of spinners, with each spinner comprising:
a drive shaft that extends longitudinally through the spinner, the drive shaft comprising an upper portion and a lower portion;
a fastener that retains the lower portion coupled to the upper portion; and
a sleeve that surrounds the drive shaft, the sleeve being configured to be removed from the spinner assembly when the lower portion of the drive shaft is disconnected from the upper portion of the drive shaft and when the fastener is removed from the upper portion, wherein the upper portion of the drive shaft remains coupled to the spinner assembly when the lower portion of the drive shaft is removed from the spinner assembly, wherein a first portion of the upper portion extends within the sleeve and into the lower portion, and wherein a second portion of the lower portion extends within the sleeve and surrounds the first portion.

16. The system of claim 15, further comprising a spinner subassembly, wherein the upper portion of the drive shaft is rotationally coupled to an upper plate of the spinner subassembly via a first bearing, wherein the lower portion of the drive shaft is rotationally coupled to a lower plate of the spinner subassembly via a second bearing, and wherein a fastener that attaches the lower portion to the upper portion is configured to increase or decrease a compression on the first bearing and the second bearing.

17. The system of claim 16, wherein the lower plate prevents removal of the sleeve from the drive shaft when the lower plate is assembled in the spinner subassembly, and wherein the sleeve is removable from the drive shaft when the lower plate is removed from the spinner subassembly.

18. The system of claim 15, wherein the spinner assembly comprises a first subassembly and a second subassembly, with the first subassembly comprising a first spinner and a second spinner and the second subassembly comprising a third spinner and a fourth spinner.

19. The system of claim 18, further comprising a coupling assembly that couples the first subassembly to the second subassembly, wherein the coupling assembly simultaneously moves the first subassembly and the second subassembly relative to a center axis of the spinner assembly.

20. The system of claim 19, wherein the coupling assembly moves the first subassembly a first distance relative to the center axis and simultaneously moves the second subassembly a second distance relative to the center axis.

\* \* \* \* \*